(12) United States Patent
Takahashi et al.

(10) Patent No.: US 10,540,412 B2
(45) Date of Patent: Jan. 21, 2020

(54) INFORMATION PROCESSING SYSTEM CAPABLE OF PROMOTING COMMUNICATION BETWEEN USERS, INFORMATION PROCESSING APPARATUS, NON-TRANSITORY STORAGE MEDIUM ENCODED WITH COMPUTER READABLE PROGRAM, AND METHOD OF CONTROLLING INFORMATION PROCESSING APPARATUS

(71) Applicant: NINTENDO CO., LTD., Kyoto-shi, Kyoto (JP)

(72) Inventors: Ryutaro Takahashi, Kyoto (JP); Yoshio Sakamoto, Kyoto (JP); Noriyuki Sato, Kyoto (JP); Hayuru Soma, Kyoto (JP); Ginga Kamei, Kyoto (JP); Ryoma Aoki, Kyoto (JP); Masayuki Okada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 400 days.

(21) Appl. No.: 14/978,096

(22) Filed: Dec. 22, 2015

(65) Prior Publication Data

US 2016/0371380 A1 Dec. 22, 2016

(30) Foreign Application Priority Data

Jun. 22, 2015 (JP) .................. 2015-124694

(51) Int. Cl.
*G06F 17/30* (2006.01)
*G06F 16/9535* (2019.01)
*G06Q 50/00* (2012.01)

(52) U.S. Cl.
CPC ......... *G06F 16/9535* (2019.01); *G06Q 50/01* (2013.01)

(58) Field of Classification Search
CPC .................. G06F 17/30867; G06Q 50/01
(Continued)

(56) References Cited

U.S. PATENT DOCUMENTS 6,826,540 B1* 11/2004 Plantec .................. G06Q 30/02
705/7.32
2002/0007312 A1* 1/2002 Yokogawa ......... G06Q 30/0217
705/14.19
(Continued)

FOREIGN PATENT DOCUMENTS

JP 2013-178741 9/2013
JP 2014-106697 6/2014
(Continued)

*Primary Examiner* — Kuen S Lu
(74) *Attorney, Agent, or Firm* — Nixon & Vanderhye, P.C.

(57) ABSTRACT

In an information processing system in which a plurality of terminals can communicate data through a server, a first terminal includes a question event processing portion which executes a question event to have a character displayed to a user who operates the first terminal and to output question information in association with the character, an answer acceptance portion which accepts input of answer information to the question information, and an answer transmission portion which transmits the answer information accepted by the answer acceptance portion to the server. A second terminal includes an answer reception portion which receives the answer information from the server and an answer event processing portion which executes an answer event to have a character displayed to a user who operates the second terminal based on the answer information received by the answer reception portion and to output the answer information in association with the character.

19 Claims, 29 Drawing Sheets

(58) Field of Classification Search
USPC .......................................................... 707/780
See application file for complete search history.

(56) References Cited

U.S. PATENT DOCUMENTS

| | | | | |
|---|---|---|---|---|
| 2002/0055386 | A1* | 5/2002 | Yotsugi | A63F 13/12 463/42 |
| 2008/0182231 | A1* | 7/2008 | Cohen | G09B 7/00 434/350 |
| 2009/0248665 | A1* | 10/2009 | Garg | G06F 16/90324 |
| 2010/0041455 | A1* | 2/2010 | Kura | A63F 13/12 463/9 |
| 2014/0282874 | A1* | 9/2014 | Bennette | H04L 63/08 726/3 |
| 2015/0081788 | A1 | 3/2015 | Takuma | |
| 2016/0196336 | A1* | 7/2016 | Allen | G06F 16/9535 707/734 |
| 2016/0308803 | A1* | 10/2016 | Kim | G09B 7/07 |

FOREIGN PATENT DOCUMENTS

| | | |
|---|---|---|
| JP | 2014-119773 | 6/2014 |
| JP | 2015-056127 | 3/2015 |

\* cited by examiner

FIG.5

| ID | QUESTION |
|---|---|
| Q1 | WHERE ARE YOU FROM ? |
| Q2 | WHAT DID YOU PLAY WHEN YOU WERE CHILD ? |
| Q3 | WHERE DID YOU GO RECENTLY ? |
| ⋮ | ⋮ |

FIG.6

| TERMINAL ID | USER NAME | CHARACTER ID | FRIEND CHARACTER ID |
|---|---|---|---|
| T1 | USER P | A | B, C,··· |
| T2 | USER Q | B | A, C,··· |
| T3 | USER R | C | A, B,··· |
| ⋮ | ⋮ | ⋮ | ⋮ |

US 10,540,412 B2

INFORMATION PROCESSING SYSTEM CAPABLE OF PROMOTING COMMUNICATION BETWEEN USERS, INFORMATION PROCESSING APPARATUS, NON-TRANSITORY STORAGE MEDIUM ENCODED WITH COMPUTER READABLE PROGRAM, AND METHOD OF CONTROLLING INFORMATION PROCESSING APPARATUS

This nonprovisional application is based on Japanese Patent Application No. 2015-124694 filed with the Japan Patent Office on Jun. 22, 2015, the entire contents of which are hereby incorporated by reference.

FIELD

The present disclosure relates to an information processing system in which information terminals can communicate data.

BACKGROUND AND SUMMARY

Portable information terminals such as smartphones have recently widely been used. Opportunities for users to make use of various network services through such portable information terminals have also increased.

In addition, what is called social network service (SNS) has also become prevalent. The SNS can be made use of not only through personal computers but also through portable information terminals, and SNS made use of only through portable information terminals is also provided. Actually, more users are enjoying SNS with their portable information terminals. In such SNS, users can read postings.

In order for a user to disseminate information, conventionally, no content has been posted unless the user actively inputs characters or selects a taken photograph. Therefore, since an amount of disseminated information is different based on difference in motivation to disseminate information for each user, there has been a room for improvement in promotion of communication.

An object of this disclosure is to provide an information processing system, an information processing apparatus, a non-transitory storage medium encoded with a computer readable program, and a method of controlling an information processing apparatus, which allow promotion of communication between users.

In a system including a first terminal, a second terminal, and a server according to one aspect, the server includes a memory which stores a plurality of pieces of question information and stores relation information as to whether or not a first user of the first terminal and a second user of the second terminal have prescribed relation with each other and a first processor. The first processor automatically selects one piece of question information from the plurality of pieces of question information and transmits the selected question information to the first terminal. The first terminal includes a first display and a second processor. The second processor causes the first display to display a character and question information in association with the character, accepts input of answer information to the question information from the first user, and transmits the accepted answer information to the server, the answer information not including information on the second terminal. The first processor of the server receives the answer information, determines whether or not the first user and the second user have prescribed relation with each other based on the relation information stored in the memory, and transmits the received answer information to the second terminal when the user of the first terminal and the user of the second terminal have prescribed relation with each other. The second terminal includes a second display and a third processor. The third processor receives the answer information from the server and causes the second display to display the character and the answer information in association with the character.

An information processing system in which a plurality of terminals can communicate data through a server according to one aspect. A first terminal includes a question event processing portion which executes a question event to have a character displayed to a user who operates the first terminal and to output question information in association with the character, an answer acceptance portion which accepts input of answer information to the question information from the user, and an answer transmission portion which transmits the answer information accepted by the answer acceptance portion to the server. A second terminal includes an answer reception portion which receives the answer information from the server and an answer event processing portion which executes an answer event to have a character displayed to a user who operates the second terminal based on the answer information received by the answer reception portion and to output the answer information in association with the character.

In the exemplary embodiment, the answer transmission portion of the first terminal transmits the answer information including information associated with the character to the server. The answer reception portion of the second terminal may receive the answer information from the server, and the answer event processing portion of the second terminal may execute the answer event to output the answer information through the character of the question event to another user based on the answer information received by the answer reception portion.

In the exemplary embodiment, the character includes a character associated with the user or a character associated with another user.

In the exemplary embodiment, the character includes an avatar representing the user or an avatar representing another user.

In the exemplary embodiment, the character is configured with a three-dimensional data.

In the exemplary embodiment, the question event processing portion may arrange the character in a virtual space and have the character displayed as the question event.

In the exemplary embodiment, the answer event processing portion of the second terminal may provide animated representation of the character in accordance with the answer information and output the answer information.

In the exemplary embodiment, the question event processing portion may have the character and the question information associated with the character displayed.

In the exemplary embodiment, a plurality of second terminals may be provided, and the server may transmit the answer information received from the first terminal to each of the second terminals.

In the exemplary embodiment, the answer transmission portion of the first terminal may transmit the answer information accepted by the answer acceptance portion to the server without designating a destination of the second terminal.

In the exemplary embodiment, the server includes an association information storage portion which stores association information on at least one second terminal associated with the first terminal and a transmission management portion which has the answer information received from the first terminal transmitted to an associated second terminal based on the association information.

In the exemplary embodiment, the answer acceptance portion of the first terminal may accept input of a word as the answer information to the question information from the user, and the answer event processing portion of the second terminal may output as the answer event, an answer sentence including the word in the answer information through the character to another user based on the answer information received by the answer reception portion.

In the exemplary embodiment, the server includes a question information storage portion which stores a plurality of pieces of question information in advance, a question information selection portion which selects at least one piece of question information from the plurality of pieces of question information regardless of an operation by a user other than the user who operates the first terminal, and a question information transmission portion which transmits the selected question information to the first terminal.

In the exemplary embodiment, the answer event processing portion of the second terminal may output the question information in association with the character to the user who operates the second terminal after the answer information is output.

In the exemplary embodiment, the first terminal further includes a specific information transmission portion which transmits specific information of which destination is designated as the second terminal, and the second terminal further includes a specific information reception portion which receives the specific information from the server and a specific event processing portion which executes a specific event to output the specific information through the character to another user based on the specific information received by the specific information reception portion.

An information processing apparatus capable of communicating data with another information processing apparatus through a server according to one aspect includes a question event processing portion which executes a question event to have a character displayed to a user who operates the information processing apparatus and to output question information in association with the character, an answer acceptance portion which accepts input of answer information to the question information from the user, an answer transmission portion which transmits the answer information accepted by the answer acceptance portion to the server, an answer reception portion which receives answer information transmitted from another information processing apparatus from the server, and an answer event processing portion which executes an answer event to output the answer information through a character to the user based on the answer information received by the answer reception portion.

A program executed by a computer of an information processing apparatus capable of communicating data with another information processing apparatus through a server according to one aspect causes the computer of the information processing apparatus to function as a question event processing portion which executes a question event to have a character displayed to a user who operates the information processing apparatus and to output question information in association with the character, an answer acceptance portion which accepts input of answer information to the question information from the user, an answer transmission portion which transmits the answer information accepted by the answer acceptance portion to the server, an answer reception portion which receives answer information transmitted from another information processing apparatus from the server, and an answer event processing portion which executes an answer event to output the answer information through a character to the user based on the answer information received by the answer reception portion.

A method of controlling an information processing apparatus capable of communicating data with another information processing apparatus through a server according to one aspect includes the steps of executing a question event to have a character displayed to a user who operates the information processing apparatus and to output question information in association with the character, accepting input of answer information to the question information from the user, transmitting the accepted answer information to the server, receiving answer information transmitted from another information processing apparatus from the server, and executing an answer event to output the answer information through a character to the user based on the received answer information.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 is a diagram illustrating a content of a list of questions in a question event based on the first embodiment.

FIG. 6 is a diagram illustrating data stored in an association information storage portion 44 based on the first embodiment.

DETAILED DESCRIPTION OF NON-LIMITING EXAMPLE EMBODIMENTS

Figure 1:
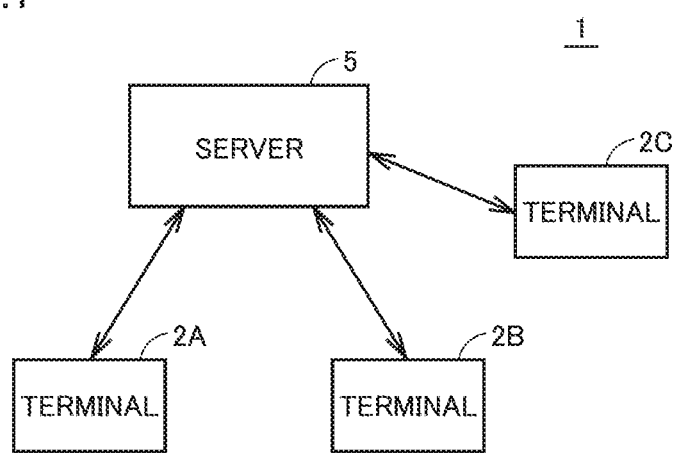
FIG. 1 is a diagram showing a configuration of one example of an information processing system based on a first embodiment.

This embodiment will be described in detail with reference to the drawings. The same or corresponding elements in the drawings have the same reference characters allotted and description thereof will not be repeated.

First Embodiment

<Configuration of Information Processing System>

FIG. 1 is a diagram showing a configuration of one example of an information processing system based on a first embodiment.

As shown in FIG. 1, an information processing system 1 includes a server 5 and a plurality of terminals 2A to 2C. Terminals 2A to 2C are provided to be able to communicate with server 5 and can communicate data with another terminal through server 5.

Terminals 2A to 2C are any information processing apparatuses which can communicate data. In the present first embodiment, terminals 2A to 2C may be, for example, a portable (also referred to as mobile) device such as a portable game device, a portable telephone, or a smartphone, a stationary device such as a personal computer or a home game console, or a large apparatus such as an arcade game machine.

Server 5 is any information processing apparatus capable of communicating data with terminals 2A to 2C. Though terminals 2A to 2C are described in the present example, limitation to that number of terminals is not particularly intended, and more terminals can also be provided so long as the number is two or more.

A configuration of terminals 2A to 2C (hereinafter also collectively referred to as terminal 2) will be described below.

Figure 2:
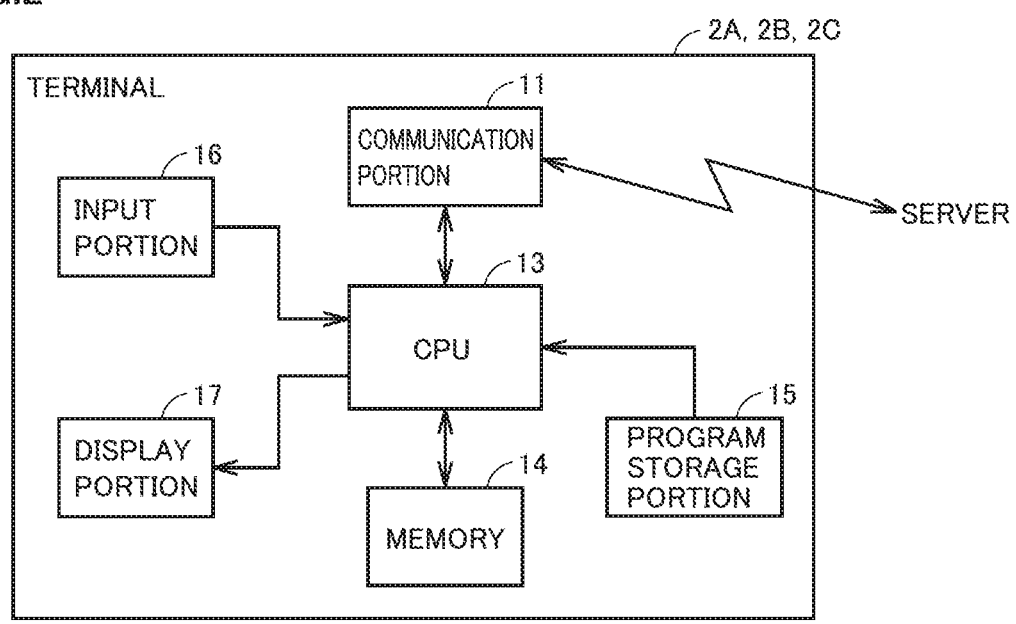
FIG. 2 is a diagram illustrating a configuration of a terminal 2 based on the first embodiment.

FIG. 2 is a diagram illustrating a configuration of terminal 2 based on the first embodiment.

As shown in FIG. 2, terminal 2 includes a communication portion 11, a CPU 13, a memory 14, a program storage portion 15, an input portion 16, and a display portion 17. CPU 13 is an information processing portion for performing various types of information processing performed in terminal 2. CPU 13 performs various types of information processing by interacting with memory 14. Program storage portion 15 stores various programs (including a communication program and an application program) executed in terminal 2. Program storage portion 15 is implemented by any storage device (a storage medium) which can be accessed by CPU 13. Program storage portion 15 may be implemented by a storage portion contained in terminal 2 such as a hard disk or a memory, a storage medium attachable to or removable from terminal 2 such as an optical disk or a cartridge, or both of the storage portion and the storage medium.

In the present first embodiment, in terminal 2, at least two types of programs of an application program and a communication program are stored in program storage portion 15.

An application program is a program for executing any application. The application program may be, for example, a game program performing game processing using game data by reading the game data.

A communication program is a program for data communication with server 5. For example, a communication program has communication portion 11 perform an operation for communication in response to a command from an application.

Input portion 16 is implemented as a button or a touch panel and accepts an instruction from a user.

Display portion 17 displays an image generated through information processing.

Terminal 2 may be implemented by a plurality of apparatuses. For example, terminal 2 may be configured in such a manner that an apparatus including communication portion 11 is removably connected to an apparatus including CPU 13 and memory 14. Terminal 2 may be implemented by a main body apparatus having CPU 13 and an apparatus having input portion 16 and/or display portion 17 which are separate from each other. For example, in another first embodiment, terminal 2 may be implemented by a main body apparatus and a terminal apparatus having input portion 16 and display portion 17, or by a main body apparatus and an operation apparatus having input portion 16. Terminal 2 may employ a television as a display apparatus, without including display portion 17.

In another first embodiment, at least a part of information processing performed in terminal 2 may be performed as distributed among a plurality of apparatuses capable of communicating over a network (a wide area network and/or a local network).

Figure 3:
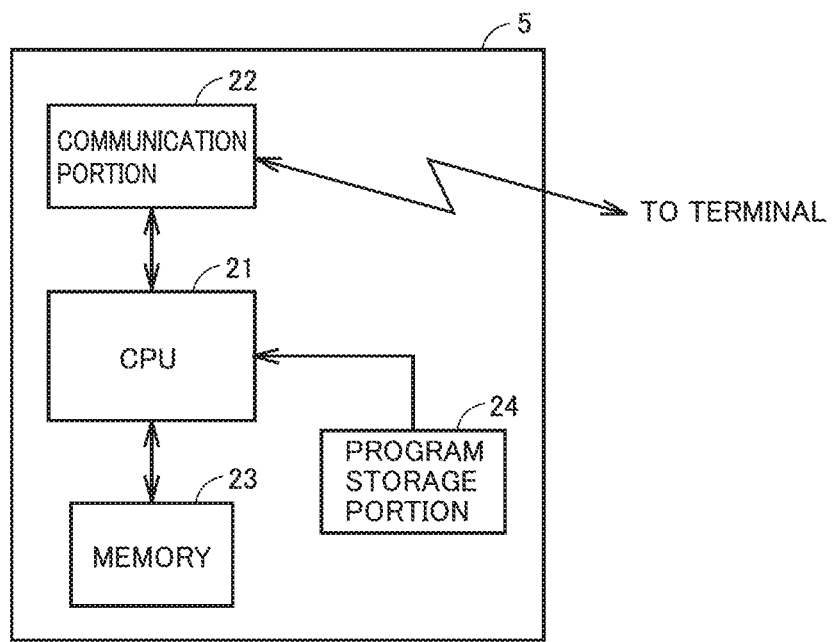
FIG. 3 is a diagram illustrating a configuration of a server 5 based on the first embodiment.

FIG. 3 is a diagram illustrating a configuration of server 5 based on the first embodiment.

Referring to FIG. 3, server 5 includes a communication portion 22, a CPU 21, a memory 23, and a program storage portion 24. Since each function is basically the same as described in connection with terminal 2, detailed description thereof will not be repeated. Though an input portion and a display portion are not provided, an input portion and a display portion can also be provided.

<Functional Block Configuration>

Figure 4:
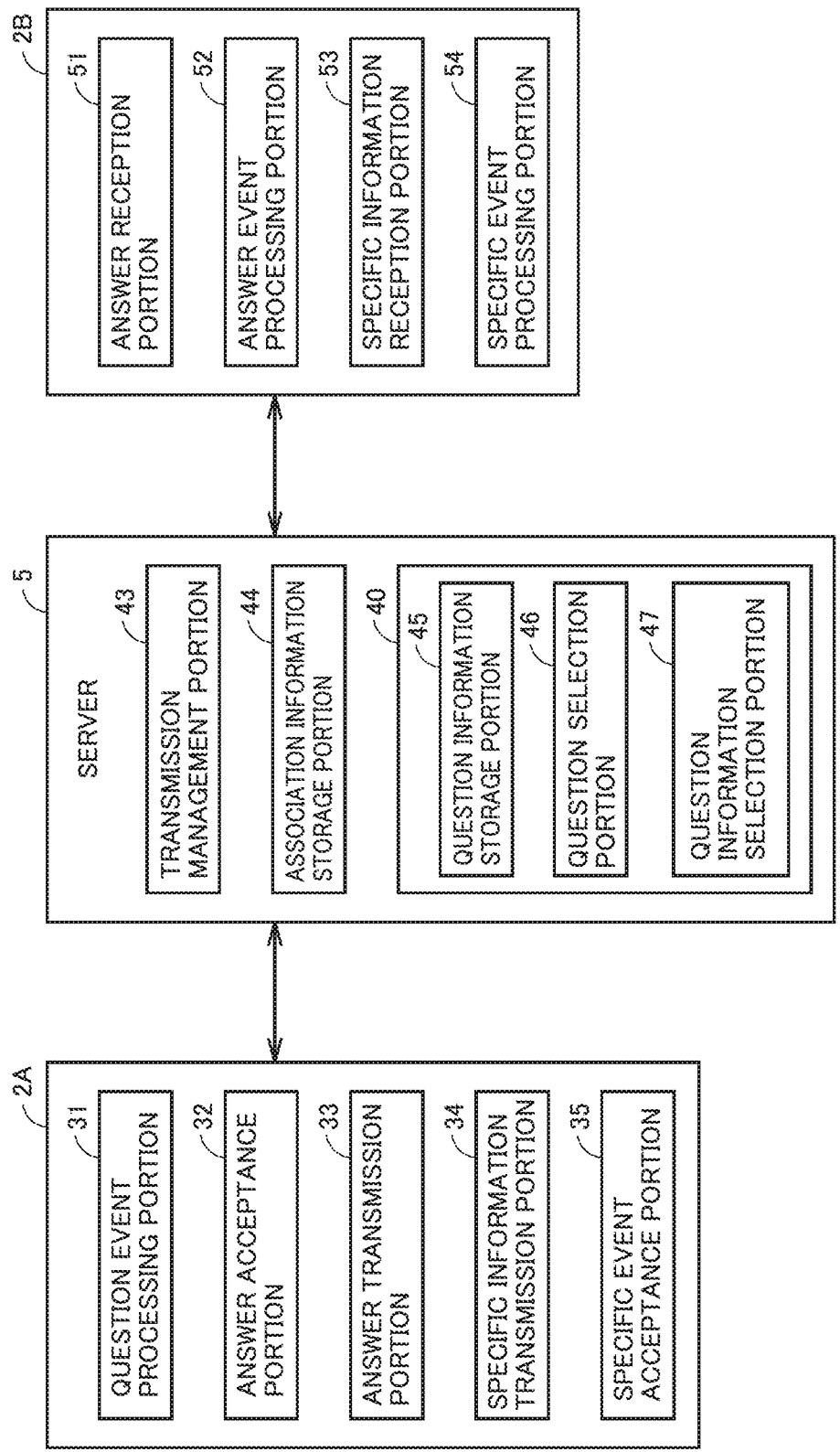
FIG. 4 is a diagram illustrating each functional block configuration of an information processing system 1 based on the first embodiment.

FIG. 4 is a diagram illustrating each functional block configuration of information processing system 1 based on the first embodiment.

FIG. 4 shows, by way of example, a functional block configuration of terminals 2A and 2B and server 5. In the present example, data communication between terminal 2A and terminal 2B through server 5 will be described.

The functional block of terminals 2A and 2B is implemented as CPU 13 of terminal 2 executes a program stored in program storage portion 15 in cooperation with each portion.

The functional block of server 5 is implemented as CPU 21 of server 5 executes a program stored in program storage portion 24 in cooperation with each portion.

Terminal 2A includes a question event processing portion 31, an answer acceptance portion 32, an answer transmission portion 33, a specific information transmission portion 34, and a specific event acceptance portion 35.

Question event processing portion 31 executes a question event to have a character displayed to an operating user and to output question information in association with the character, in response to an instruction from server 5.

The character includes both of a character associated with a user of terminal 2A and a character associated with another user of another terminal. The character is an avatar representing a user or an avatar representing another user. In the present first embodiment, processing for inquiring of a user for question information by making use of a character is performed as a question event.

A program stored in program storage portion 15 of each terminal 2 includes a generation program for generating a character made use of by a user of each terminal 2, and the user of each terminal 2 generates in advance a character he/she uses by means of the generation program. Then, as the character is generated, a character ID uniquely specifying the character is issued. Each terminal 2 can form a character based on information associated with the character (character ID) and display and output the character.

The information associated with the character (which is also referred to as character-association information) is data for specifying a character, and in the present example, by way of example, it is described as the character ID. Detailed data of each part or a part ID representing each part may be included as character data necessary for configuring a character, together with the character ID.

A program stored in program storage portion 15 of each terminal 2 includes a friend registration program, and the user of each terminal 2 registers a friend with which a group is formed as necessary by means of the friend registration program.

There are various schemes for a friend registration scheme, and for example, a friend may be registered by exchanging information through infrared communication. Alternatively, a server may be made use of. For example, a friend can also be registered when a server recognizes that users face each other based on position information by making use of a global positioning system (GPS) function provided in each terminal 2. Alternatively, users who have already been friends through social networking service (SNS) can be displayed on each terminal 2 as "maybe friend" and a friend can also be registered after processing for registration application and approval. Alternatively, a friend registration program allowing friend registration by exchanging a prescribed code (a friend code) predetermined for each terminal 2 between users and entering the exchanged code is included, so that the user of each terminal 2 registers a friend with which a group is formed as necessary by means of the friend registration program.

Information on each terminal 2 (a user name, a character ID, and friend relation) is transmitted to server 5 and managed by server 5. In the present example, the information is stored in an association information storage portion 44 which will be described later.

Answer acceptance portion 32 accepts input of answer information to the question information from a user in response to a question event.

Answer transmission portion 33 transmits the answer information accepted by answer acceptance portion 32 to server 5. Therefore, answer transmission portion 33 transmits the information to server 5 without designating a transmission destination of the answer information.

Specific event acceptance portion 35 performs processing for accepting a specific event in accordance with an instruction from a user. Specifically, specific event acceptance portion 35 performs processing for accepting designation (specifying) of information to be transmitted and of a destination to which the information is to be transmitted as the processing for accepting the specific event.

Specific information transmission portion 34 transmits specific information of which destination has been designated and which has been accepted by specific event acceptance portion 35 to server 5. By way of example, the specific information of which destination is designated as terminal 2B is transmitted to server 5. Transmission of the specific information is communication between designated terminals, and for example, when terminal 2A designates terminal 2B as the destination, data is not communicated with terminal 2C.

Terminal 2B includes an answer reception portion 51, an answer event processing portion 52, a specific information reception portion 53, and a specific event processing portion 54.

Answer reception portion 51 receives the answer information through server 5.

Answer event processing portion 52 executes an answer event to have a character displayed to another user who operates a terminal and to output the answer information in association with a character, based on the answer information received by answer reception portion 51.

In the present first embodiment, processing for outputting answer information by making use of a character to a user is performed as the answer event.

Specific information reception portion 53 receives specific information from a designated destination through server 5.

Specific event processing portion 54 executes a specific event to output the specific information through the character to another user based on the specific information received by specific information reception portion 53.

In the present first embodiment, processing for outputting specific information by making use of a character to a user is performed as the specific event.

Server 5 includes a question management portion 40, a transmission management portion 43, and association information storage portion 44.

Association information storage portion 44 stores each terminal provided to be able to communicate with server 5 and association information representing relation between a terminal and another terminal. Specifically, association information storage portion 44 stores information on a user who makes use of each terminal and on a character made use of by the user. Association information storage portion 44 includes also information on another terminal registered as a friend for each terminal (a character corresponding to another terminal).

Transmission management portion 43 has answer information received from terminal 2A transmitted to terminal 2B registered as a friend, based on association information stored in association information storage portion 44.

Question management portion 40 instructs terminal 2A to execute a question event based on the association information stored in association information storage portion 44.

Question management portion 40 includes a question information storage portion 45, a question selection portion 46, and a question information transmission portion 47.

Question information storage portion 45 stores a plurality of question messages for executing a question event in a terminal.

Question selection portion 46 selects at least one from among the question messages stored in question information storage portion 45. A question message may randomly be selected or a question once selected may not be selected again. Namely, a question message is automatically selected regardless of an operation by a user who operates a terminal other than the terminal which executes a question event.

Question information transmission portion 47 transmits question information selected by question selection portion 46 to terminal 2. Question information transmission portion 47 may transmit, together with the question information, character-association information for designating a character which appears in the question event.

FIG. 5 is a diagram illustrating a content of a list of questions stored in question information storage portion 45 based on the first embodiment.

As shown in FIG. 5, a plurality of question messages associated with a plurality of question IDs, respectively, are registered as a question list.

By way of example, a question message "where are you from?" is registered in correspondence with a question ID "Q1".

A question message "what did you play when you were child?" is registered in correspondence with a question ID "Q2".

A question message "where did you go recently?" is registered in correspondence with a question ID "Q3".

As question information is transmitted from server 5 to terminal 2A, a question event relating to a corresponding question is executed. In the present example, a case that only a question message selected by question selection portion 46 is transmitted to terminal 2A as question information is described. A question ID may be transmitted to terminal 2A as question information, together with a question message.

Question management portion 40 can also have character-association information (character ID) transmitted to terminal 2A together with the question information. As the character-association information (character ID) is transmitted, a question event based on a designated character is executed. The character-association information is not essential, and only question information may be transmitted to terminal 2A. In this case, a question event should only be executed based on a character created by a user P of terminal 2A.

FIG. 6 is a diagram illustrating data stored in association information storage portion 44 based on the first embodiment.

As shown in FIG. 6, a terminal ID is issued for each terminal. A user name and a character ID are brought in correspondence for each terminal ID. A character ID corresponding to a terminal and a character ID corresponding to another terminal registered as friends are also registered in association.

By way of example, terminal IDs "T1" to "T3" are allocated in correspondence with terminals 2A to 2C, respectively.

User P and a character A generated by user P are registered in correspondence with terminal ID "T1" corresponding to terminal 2A. Terminal 2A and a character corresponding to a terminal with which friend relation is registered (friend characters B, C, . . . ) are registered in correspondence. Though description is given here with a character name being defined as a character ID for the sake of brevity of description, limitation to a character name is not particularly intended and a code number may also be acceptable. Anything is acceptable so long as a character can be specified.

A user Q and character B generated by user Q are registered in correspondence with terminal ID "T2" corresponding to terminal 2B. Terminal 2B and a character corresponding to a terminal with which friend relation has been registered (friend characters A, C, . . . ) are registered in correspondence.

A user R and character C generated by user R are registered in correspondence with terminal ID "T3" corresponding to terminal 2C. Terminal 2C and a character corresponding to a terminal with which friend relation has been registered (a friend character A, B, . . . ) are registered in correspondence.

Other terminal IDs are also similarly registered in association with data.

Figure 7:
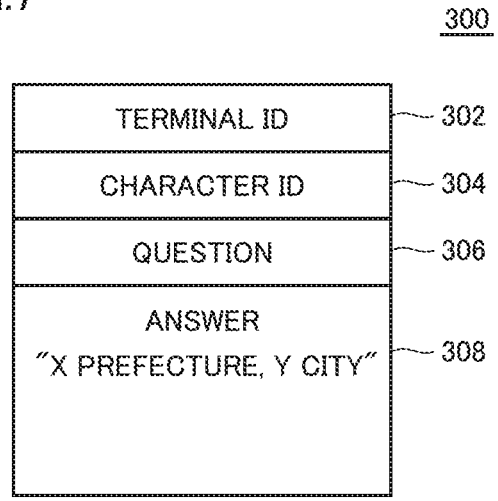
FIG. 7 is a diagram illustrating one example of data of answer information transmitted to server 5 based on the first embodiment.

FIG. 7 is a diagram illustrating one example of data of answer information transmitted to server 5 based on the first embodiment.

FIG. 7 shows transmission data 300 which is answer information generated and transmitted to server 5 by answer transmission portion 33 of terminal 2A.

Transmission data 300 includes terminal ID data 302, character ID data 304, question data 306, and answer data 308.

Terminal ID data 302 is data for specifying a transmitter terminal.

Character ID data 304 is data for specifying a character.

Question data 306 is data representing a content of a question asked in a question event in a terminal.

Answer data 308 is data representing a content of an accepted answer.

Figure 8:
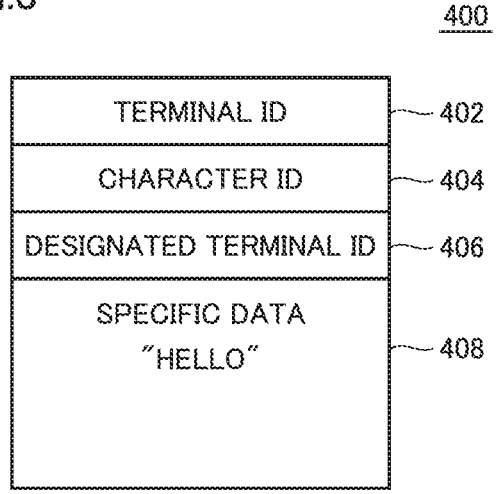
FIG. 8 is a diagram illustrating one example of data of specific information transmitted to server 5 based on the first embodiment.

FIG. 8 is a diagram illustrating one example of data of specific information transmitted to server 5 based on the first embodiment.

FIG. 8 shows transmission data 400 representing specific information generated and transmitted to server 5 by specific information transmission portion 34 of terminal 2A.

Transmission data 400 includes terminal ID data 402, character ID data 404, designated terminal ID data 406, and specific data 408.

Terminal ID data 402 is data for specifying a transmitter terminal.

Character ID data 404 is data for specifying a character.

Designated terminal ID data 406 is data for specifying a terminal designated as a transmission destination.

Specific data 408 is data representing a content of accepted input.

<Overview of Processing in Information Processing System>

Overview of processing in information processing system 1 based on the first embodiment will now be described.

Figure 9:
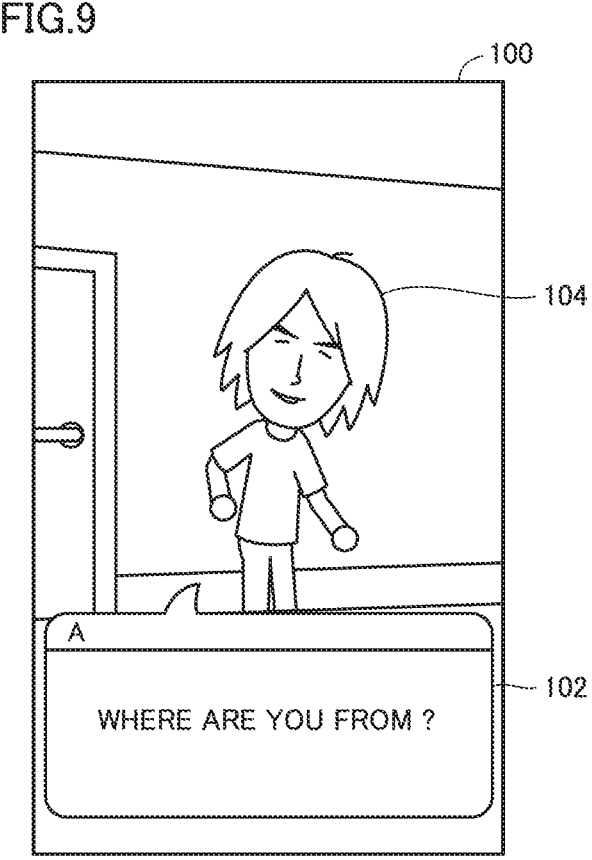
FIG. 9 is a diagram illustrating a question event based on the first embodiment.

FIG. 9 is a diagram illustrating a question event based on the first embodiment.

As shown in FIG. 9, question event processing portion 31 executes a question event to output question information through a character to a user in response to an instruction.

In the present example, a question event screen 100 is displayed on display portion 17 of terminal 2A.

A character 104 of A created by user P of terminal 2A is displayed on question event screen 100. A scene that displayed character 104 of A asks a question by displaying a question message 102 "where are you from?" is shown. Question message 102 may be displayed in accordance with motion of character 104 as a question event. Motion (effect) of character 104 may be varied in accordance with a content of question message 102. Motion (effect) of character 104 may be represented in animation. By outputting question information through the character to the user, a sense of realism to ask a question to the user can be enhanced. Thus, an answer to the question from the user can positively be invited. Zest of a question event can be enhanced by executing a question event to inquire for information which the user has by making use of character 104. Thus, a barrier to an answer from the user to the question can be lowered and answering can be facilitated.

Though a question event in which a question to a user is asked by displaying question message 102 is described in the present example, limitation to this scheme is not particularly intended, and a question event to ask a question through audio output of a content of question message 102 can also be executed. A question event which is combination of the former can also be executed.

Figure 10:
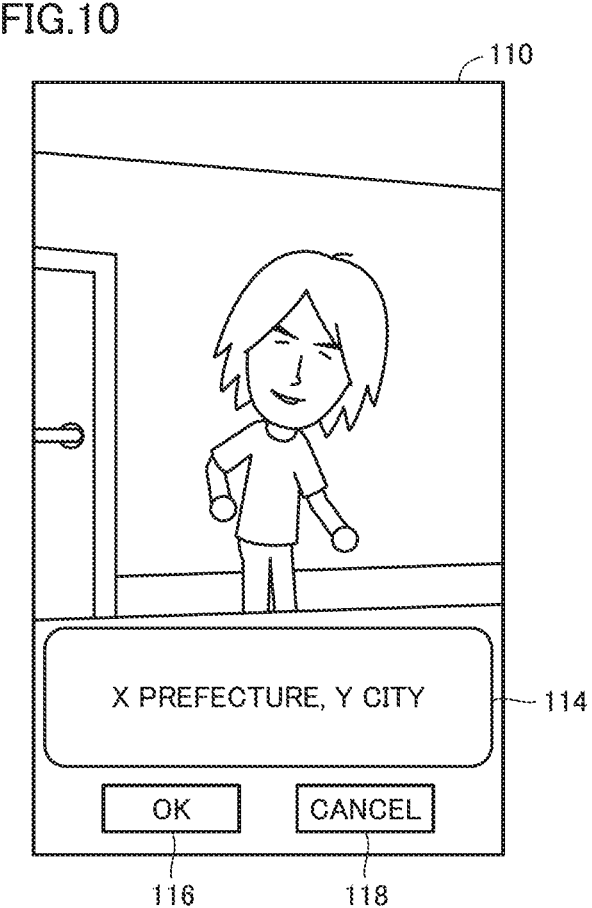
FIG. 10 is a diagram illustrating an answer screen 110 to the question event based on the first embodiment.

FIG. 10 is a diagram illustrating an answer screen 110 to the question event based on the first embodiment.

As shown in FIG. 10, answer acceptance portion 32 accepts input from a user as answer information to question event screen 100. In the present example, as the user operates input portion 16, an answer message "X prefecture, Y city" is input and displayed in an answer field 114.

In answer screen 110, an "OK" button 116 indicating completion of input of answer information and a "cancel" button 118 stopping input of answer information are provided.

When the user selects "OK" button 116, answer information is transmitted to server 5.

Specifically, answer transmission portion 33 transmits the input answer information to server 5.

When the user selects "cancel" button 118, processing for stopping input of answer information is performed. In that case, answer information is not transmitted. Answer information including information representing absence of a content of answer or representing absence of input may be transmitted to server 5.

Figure 11:
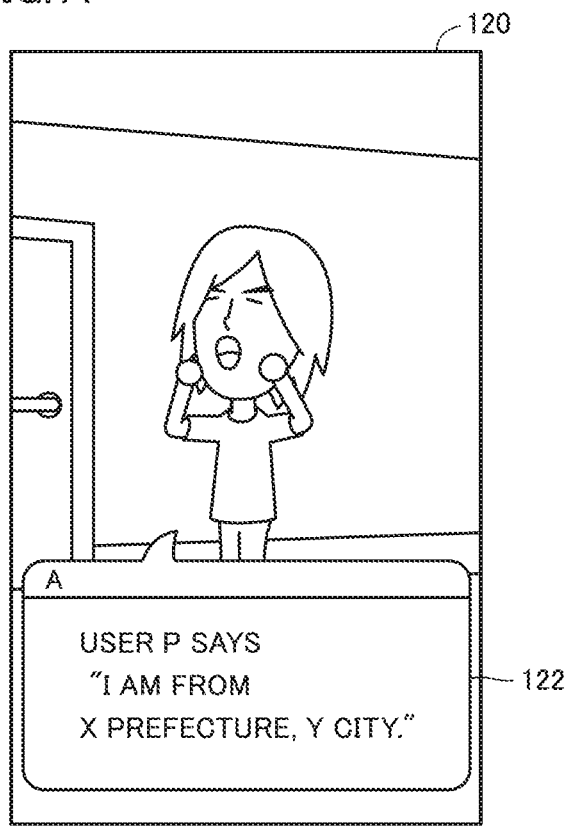
FIG. 11 is a diagram illustrating an answer event based on the first embodiment.

FIG. 11 is a diagram illustrating an answer event based on the first embodiment.

As shown in FIG. 11, answer event processing portion 52 executes an answer event to output answer information through a character to another user in response to an instruction.

In the present example, an answer event screen 120 is displayed on display portion 17 of terminal 2B of user Q.

Character 104 of A created by user P of terminal 2A is displayed on answer event screen 120. A scene that displayed character 104 of A answers by displaying an answer message 122 "user P says 'I am from X prefecture, Y city.'" is shown.

Answer message 122 may be displayed in accordance with motion of character 104 as an answer event. Motion (effect) of character 104 may be varied in accordance with a content of answer message 122. By outputting the answer information through the character to the user, a sense of realism to output an answer to the user can be enhanced. Thus, reaction by the user to the answer can positively be invited. Zest of an answer event can be enhanced by executing an answer event to answer with information which the user has, by making use of character 104.

Though an answer event in which an answer is given by displaying answer message 122 is described in the present example, limitation to that scheme is not particularly intended, and an answer event to answer through audio output of a content of answer message 122 can also be executed. An answer event which is combination of the former can also be executed.

Through the answer event, answer message 122 to the question to user P can be obtained and viewed on display portion 17 of terminal 2B of user Q.

Figure 12:
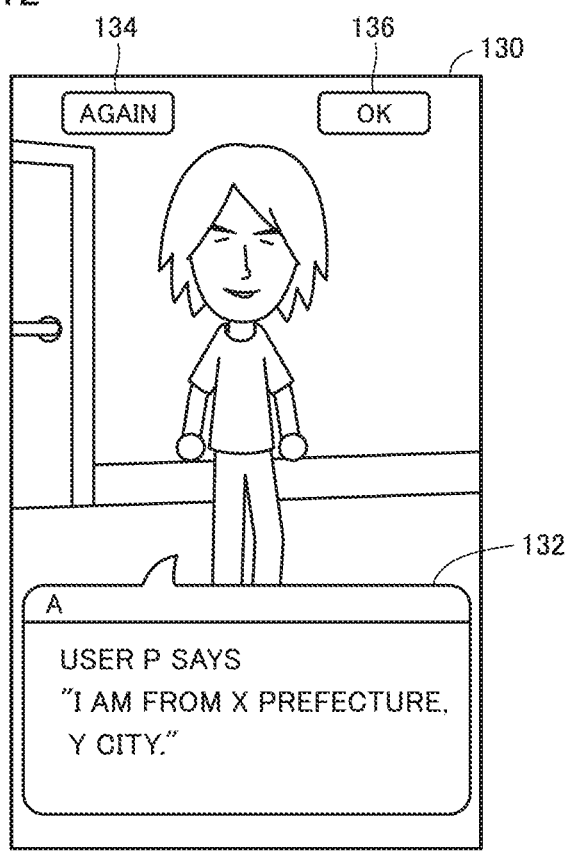
FIG. 12 is a diagram illustrating other processing of the answer event based on the first embodiment.

FIG. 12 is a diagram illustrating other processing of the answer event based on the first embodiment.

As shown in FIG. 12, answer event processing portion 52 has a screen 130 displayed for accepting input of an instruction from a user after answer event screen 120.

In screen 130, an answer event described with reference to FIG. 7 is again executed by selecting an "again button 134.

By selecting an "OK" button 136 in screen 130, answer event processing ends.

Figure 13:
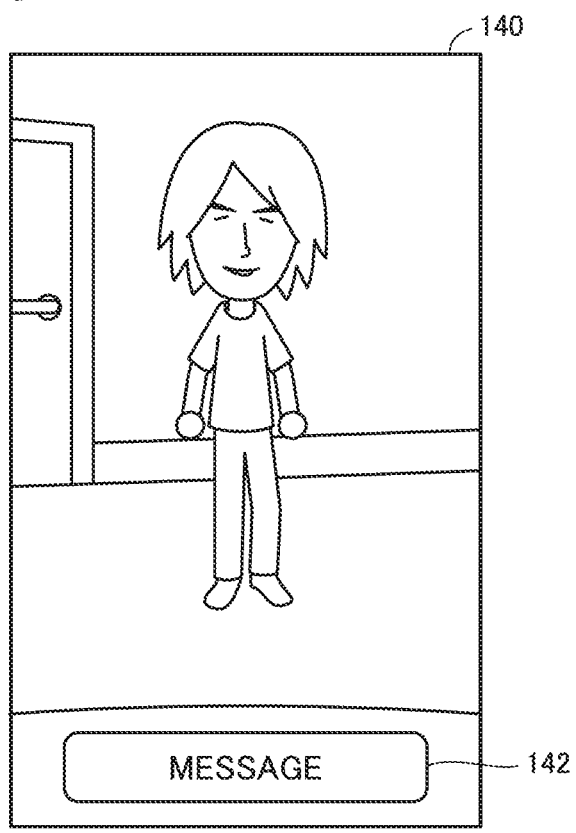
FIG. 13 is a diagram illustrating acceptance of a specific event based on the first embodiment.

FIG. 13 is a diagram illustrating acceptance of a specific event based on the first embodiment.

As shown in FIG. 13, a specific event is event processing different from a question event, and a message button 142 for executing a specific event is provided in a normal screen 140. Alternatively, message button 142 may be displayed in response to an operation instruction through input portion 16 from a user. Alternatively, the message button may be displayed together with a question event in FIG. 7.

Message button 142 is a button which can accept an instruction for a specific event for directly communicating data between a terminal of a user and a terminal of another user.

Specific event acceptance portion 35 performs processing for designating (specifying) a user with which data is to be communicated when the user selects message button 142.

Figure 14:
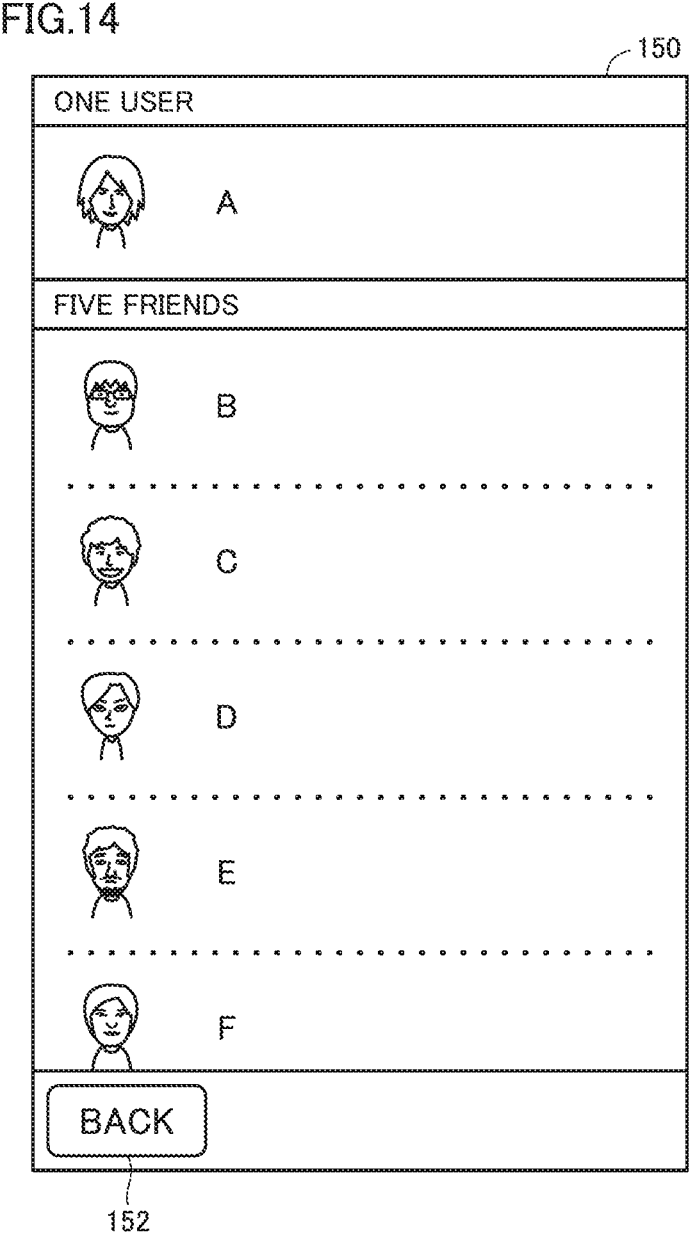
FIG. 14 is a diagram illustrating a friend selection screen for designating a user with which data is to be communicated in processing for accepting the specific event based on the first embodiment.

FIG. 14 is a diagram illustrating a friend selection screen for designating a user with which data is to be communicated in processing for accepting a specific event based on the first embodiment.

Referring to FIG. 14, specific event acceptance portion 35 accepts selection of message button 142 and has display portion 17 display a friend selection screen 150 of character A of user P.

In friend selection screen 150, a friend list of characters in friend relation with, that is, registered as friends of, character A created by user P is shown.

By way of example, a list of five characters in friend relation with character A created by user P is shown. By way of example, B, C, D, E, and F which are characters different from one another are shown.

As described above, a friend can be registered by exchanging a prescribed code (a friend code) determined for each terminal between users and entering the exchanged code.

Information on a character registered as a friend (a friend list) may be created based on data stored in memory 14 held in each terminal, or may be created based on association information obtained from association information storage portion 44 managed by server 5.

A user can designate in friend selection screen 150, a counterpart (a character) with which data is to desirably directly be communicated. Then, a terminal corresponding to a designated character is registered as a destination and information is transmitted only to the terminal at that destination.

A "back" button 152 is provided in friend selection screen 150. When "back" button 152 is selected, friend selection screen 150 ends and transition to screen 140 is made.

Figure 15:
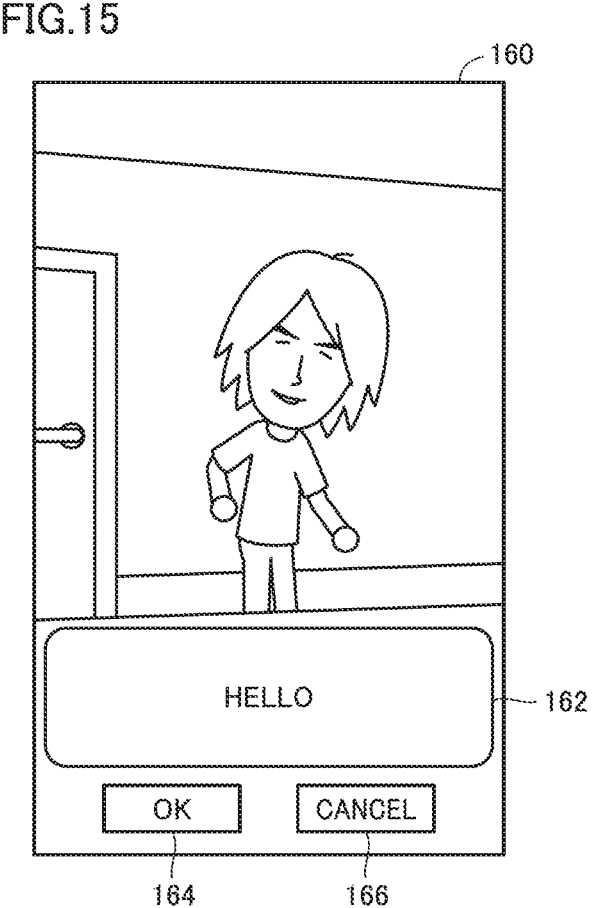
FIG. 15 is a diagram illustrating an input screen 160 in the processing for accepting the specific event based on the first embodiment.

FIG. 15 is a diagram illustrating an input screen 160 in the processing for accepting a specific event based on the first embodiment.

As shown in FIG. 15, specific event acceptance portion 35 has display portion 17 display input screen 160 after designation of a destination is accepted.

Specific event acceptance portion 35 accepts any input from a user in an input field 162 in input screen 160. In the present example, since the input information is information of which destination is designated (specified), it is also referred to as specific information.

In the present example, as the user operates input portion 16, a message "hello" is input and displayed in input field 162.

In input screen 160, an "OK" button 164 indicating completion of input of specific information and a "cancel" button 166 to stop input of specific information are provided.

When the user selects "OK" button 164, specific information is transmitted to server 5.

Specifically, specific information transmission portion 34 transmits input specific information to server 5.

When the user selects "cancel" button 166, processing for stopping input of specific information is performed. In that case, specific information is not transmitted but the screen returns to the normal screen in FIG. 10.

Figure 16:
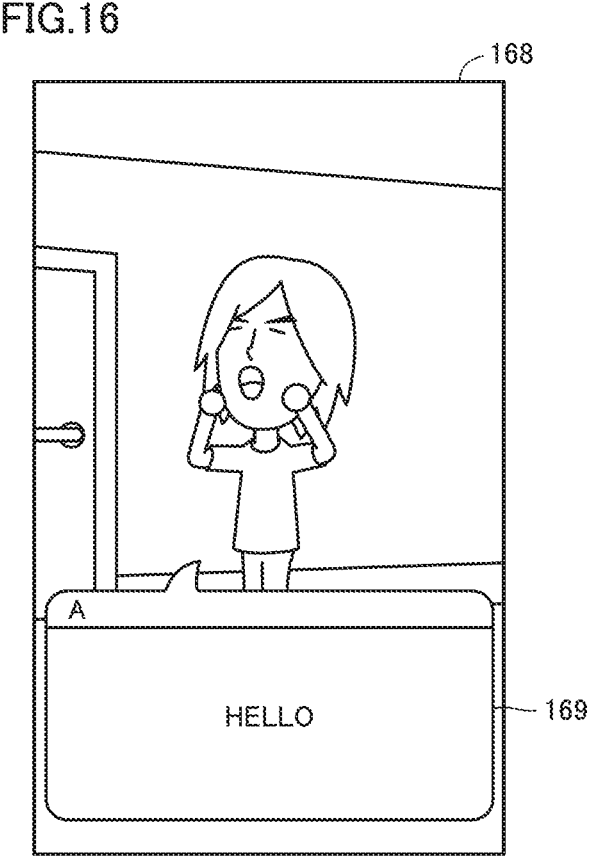
FIG. 16 is a diagram illustrating the specific event based on the first embodiment.

FIG. 16 is a diagram illustrating a specific event based on the first embodiment.

As shown in FIG. 16, specific information reception portion 53 receives through server 5, specific information of which destination has been designated. Specific event processing portion 54 executes a specific event to output specific information received by specific information reception portion 53 to another user.

In the present example, a specific event screen 168 is displayed on display portion 17 of terminal 2B of user Q.

Character 104 of A created by user P of terminal 2A is displayed in specific event screen 168. A scene that displayed character 104 of A responds by displaying a specific message 169 "hello" is shown.

Specific message 169 may be displayed in accordance with motion of character 104 as a specific event. Motion (effect) of character 104 may be varied in accordance with a content of specific message 169. By outputting specific information through the character to the user, a sense of realism to output information to the user can be enhanced. Thus, reaction by the user to the information can positively be invited. Zest of a specific event can be enhanced by executing the specific event to convey to a user at a designated destination, information a user desires to transmit by making use of character 104.

Though a specific event in which specific message 169 is displayed is described in the present example, limitation to that scheme is not particularly intended, and a specific event through audio output of a content of specific message 169 can also be executed. A specific event which is combination of the former can also be executed.

In a specific event as well, specific event processing portion 54 has a screen displayed for accepting input of an instruction from a user after specific event screen 168, as described with reference to FIG. 12.

The specific event described with reference to FIG. 16 is again executed, for example, by selecting the "again" button. The specific event processing ends by selecting the "OK" button.

Figure 17:
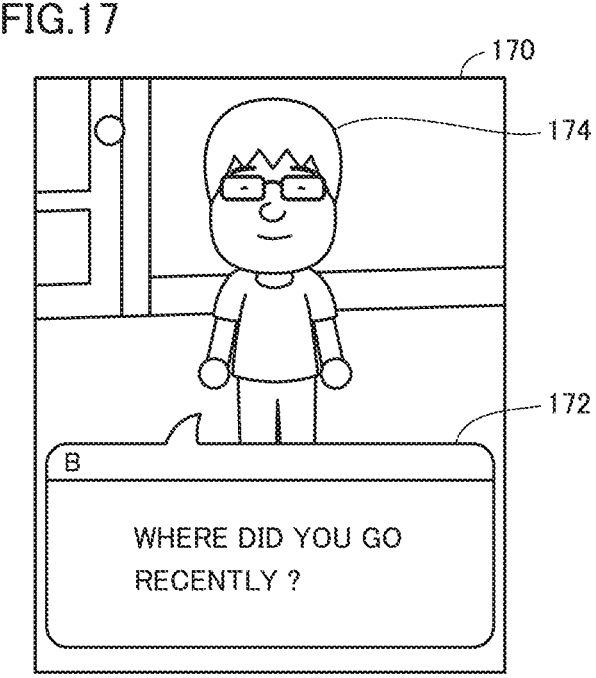
FIG. 17 is a diagram illustrating another question event based on the first embodiment.

FIG. 17 is a diagram illustrating another question event based on the first embodiment.

As shown in FIG. 17, question event processing portion 31 executes a question event to output question information through a character to a user in response to an instruction.

In the present example, a question event screen 170 is displayed on display portion 17 of terminal 2A.

In question event screen 170, a character 174 of B created by user Q of terminal 2B is displayed. A scene that displayed character 174 of B asks a question by displaying a question message 172 "where did you go recently?" is shown. Question message 172 may be displayed in accordance with motion of character 174 as a question event. Motion (effect) of character 174 may be varied in accordance with a content of question message 172.

Though a question event in which a question to a user is asked by displaying question message 172 is described in the present example, limitation to that scheme is not particularly intended, and a question event to ask a question through audio output of a content of question message 172 can also be executed. A question event which is combination of the former can also be executed.

Therefore, user P can also accept a question from the character of B created by another user Q. Through processing the same as described above, an answer message to the question to user P can be obtained and viewed in an answer event on display portion 17 of terminal 2B of user Q.

Figure 18:
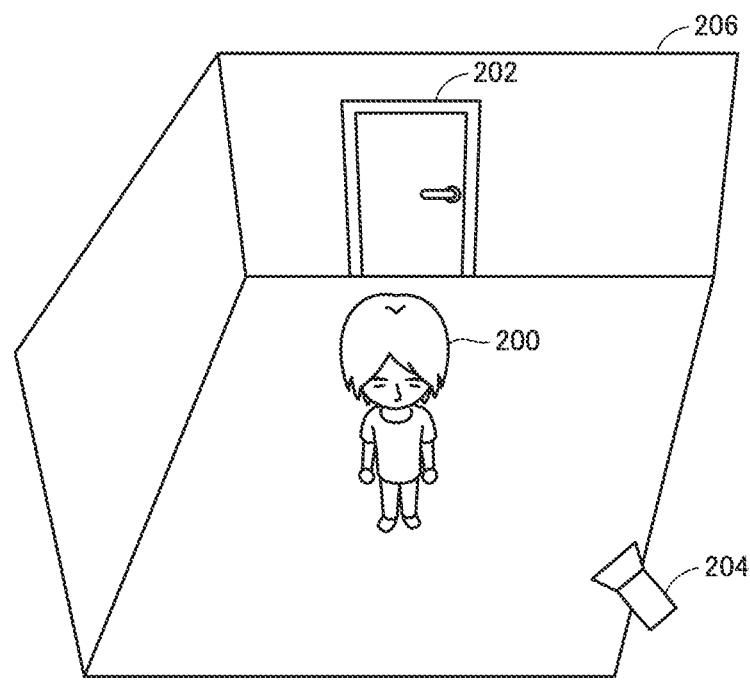
FIG. 18 is a diagram illustrating a virtual space in which event processing is performed based on the first embodiment.

FIG. 18 is a diagram illustrating a virtual space in which event processing is performed based on the first embodiment.

As shown in FIG. 18, a character 200 and a door 202 are arranged in a virtual three-dimensional room space 206. Character 200 is provided to arbitrarily be movable in room space 206. By way of example, when answer information is transmitted to server 5 in a question event or when specific information is transmitted to server 5 in a specific event, processing for such an effect that character 200 opens door 202 and goes out of the room space is performed. When answer information is received from server 5 and an answer event is executed and when specific information is received and a specific event is executed, processing for such an effect that door 202 is opened and character 200 enters the room space is performed.

A virtual camera 204 provided at a prescribed position is provided in room space 206. An image resulting from image pick-up of room space 206 by virtual camera 204 is displayed on display portion 17. Virtual camera 204 is not a fixed point camera, but a direction of line of sight of virtual camera 204 may be varied, for example, with movement of character 200. A direction of line of sight of virtual camera 204 may be adjusted in accordance with an operation instruction through input portion 16 from a user.

<Data Communication in Information Processing System>

Figure 19:
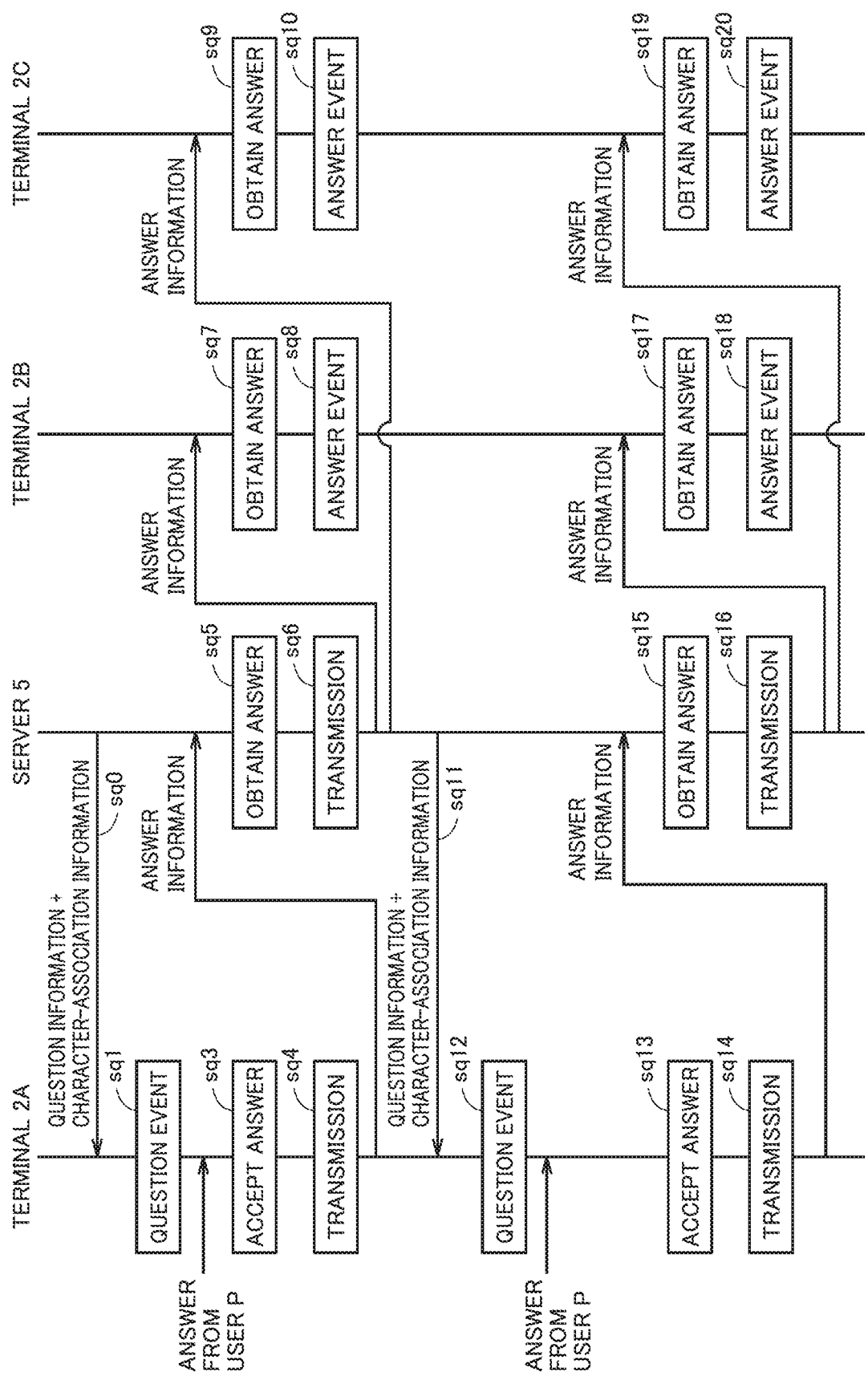
FIG. 19 is a diagram illustrating a flow of processing in data communication in the information processing system based on the first embodiment.

FIG. 19 is a diagram illustrating a flow of processing in data communication in the information processing system based on the first embodiment.

As shown in FIG. 19, by way of example, a flow of processing in data communication between terminals 2A to 2C and server 5 will be described.

By way of example, server 5 transmits question information and character-association information to terminal 2A (sequence sq0). Specifically, question selection portion 46 selects a question from a list of questions stored in question information storage portion 45. Then, question information transmission portion 47 transmits the selected question information and the character-association information to terminal 2A. By way of example, question information transmission portion 47 transmits the question information (where are you from?) and character-association information (character A).

Terminal 2A executes a question event in accordance with the question information and the character-association information received from server 5 (sequence sq1). Specifically, question event processing portion 31 executes the question event described with reference to FIG. 9 based on the question information and the character-association information.

Then, terminal 2A accepts an answer from user P (sequence sq3). Specifically, answer acceptance portion 32 accepts input of answer information from user P as described with reference to FIG. 10. By way of example, answer data "X prefecture, Y city" is accepted.

Then, terminal 2A transmits the accepted answer information to server 5 (sequence sq4). Specifically, answer transmission portion 33 generates and transmits transmission data including answer information described with reference to FIG. 7 to server 5.

Server 5 obtains answer information transmitted from terminal 2A (sequence sq5). Specifically, transmission management portion 43 obtains answer information from terminal 2A. Transmission management portion 43 selects terminal 2B and terminal 2C registered as friends as transmission destinations, based on association information stored in association information storage portion 44.

Server 5 transmits the obtained answer information to terminals 2B and 2C (sequence sq6). Specifically, transmission management portion 43 has the answer information received from terminal 2A transmitted to terminals 2B and 2C which are terminals at selected transmission destinations.

Terminal 2B obtains the answer information transmitted from terminal 2A through server 5 (sequence sq7). Specifically, answer reception portion 51 obtains the answer information transmitted from server 5.

Terminal 2B executes an answer event based on the answer information received from server 5 (sequence sq8). Specifically, answer event processing portion 52 executes the answer event described with reference to FIG. 11 based on the obtained answer information.

Terminal 2C obtains the answer information transmitted from terminal 2A through server 5 (sequence sq9). Specifically, answer reception portion 51 obtains the answer information transmitted from server 5.

Terminal 2C executes an answer event based on the answer information received from server 5 (sequence sq10). Specifically, answer event processing portion 52 executes the answer event described with reference to FIG. 11 based on the obtained answer information.

Through the processing, an answer to the question event in terminal 2A is transmitted to other terminals 2B and 2C, and the answer information of user P can be obtained as the answer event.

Then, server 5 transmits question information and character-association information again to terminal 2A (sequence sq11). Specifically, question selection portion 46 selects a question from a list of questions stored in question information storage portion 45. Then, question information transmission portion 47 transmits the selected question information and the character-association information to terminal 2A. By way of example, question information transmission portion 47 transmits the question information (what did you play when you were child?) and the character-association information (character B).

Terminal 2A executes a question event in accordance with the question information and the character-association information (sequence sq12). Specifically, question event processing portion 31 executes the question event described with reference to FIG. 17 based on the question information and the character-association information.

Then, terminal 2A accepts an answer from user P (sequence sq13). Specifically, answer acceptance portion 32 accepts input of answer information from user P as described with reference to FIG. 10.

Then, terminal 2A transmits the accepted answer information to server 5 (sequence sq14). Specifically, answer transmission portion 33 generates and transmits transmission data including the answer information as described with reference to FIG. 7 to server 5.

Server 5 obtains the answer information transmitted from terminal 2A (sequence sq15). Specifically, transmission management portion 43 obtains the answer information from terminal 2A. Transmission management portion 43 selects terminals 2B and 2C registered as friends as transmission destinations, based on the association information stored in association information storage portion 44.

Server 5 transmits the obtained answer information to terminals 2B and 2C (sequence sq16). Specifically, transmission management portion 43 has the answer information received from terminal 2A transmitted to terminals 2B and 2C which are terminals at the selected transmission destinations.

Terminal 2B obtains the answer information transmitted from terminal 2A through server 5 (sequence sq17). Specifically, answer reception portion 51 obtains the answer information transmitted from server 5.

Terminal 2B executes an answer event based on the answer information received from server 5 (sequence sq18). Specifically, answer event processing portion 52 executes the answer event as described with reference to FIG. 11 based on the obtained answer information.

Terminal 2C obtains the answer information transmitted from terminal 2A through server 5 (sequence sq19). Specifically, answer reception portion 51 obtains the answer information transmitted from server 5.

Terminal 2C executes an answer event based on the answer information received from server 5 (sequence sq20). Specifically, answer event processing portion 52 executes the answer event as described with reference to FIG. 11 based on the obtained answer information.

Though a case that a question event is executed in terminal 2A and an answer event is executed in terminals 2B and 2C is described in the present example, limitation thereto is not particularly intended, and a case that a question event is executed in another terminal such as terminal 2B and an answer event is executed in terminals 2A and 2C is also applicable.

Through the processing, an answer to the question event to terminal 2A is transmitted to other terminals 2B and 2C and the answer information of user P can be obtained as an answer event.

In the information processing system based on the present first embodiment, question information is transmitted from server 5 to a terminal and answer information is automatically transmitted to another terminal as the user answers the question event. Therefore, without requiring a user to consciously disseminate information, answer information to a question from a user is transmitted to another user, so that information is distributed and smooth communication can be promoted.

Though a case that answer information received from terminal 2A is transmitted (transferred) from server 5 to terminals 2B and 2C is described in the present example, question information for executing a question event may be added to answer information in server 5 and transmitted.

Specifically, the answer event processing portion of each of terminals 2B and 2C executes a question event based on added question information after an answer event based on the answer information is executed. Then, an answer to the question event is transmitted to server 5 as answer information. Server 5 adds question information to the answer information and transmits the resultant information to another terminal (terminal 2A by way of example). Through the processing, the answer event and the question event are successively executed in each terminal, so that server 5 can more readily obtain answer information from the terminal and communication between users can further be promoted.

Figure 20:
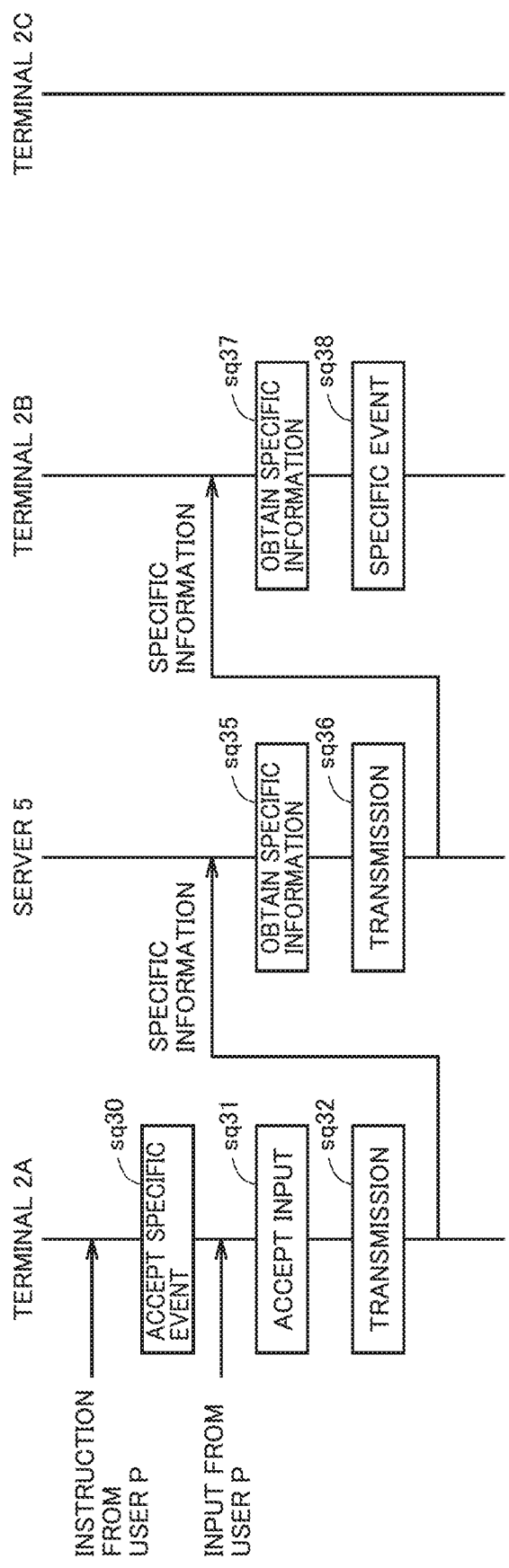
FIG. 20 is a diagram illustrating flow of other processing in data communication in the information processing system based on the first embodiment.

FIG. 20 is a diagram illustrating flow of other processing in data communication in the information processing system based on the first embodiment.

As shown in FIG. 20, here, by way of example, a flow of processing in communication of data of specific information between terminals 2A and 2B will be described.

Terminal 2A accepts an instruction from user P and performs processing for accepting a specific event (sequence sq30). Specifically, specific event acceptance portion 35 accepts selection of message button 142 and has friend selection screen 150 displayed, which has been described with reference to FIG. 14, in which a user with which data is to be communicated is designated. By way of example, terminal 2B corresponding to character B is designated.

Then, terminal 2A accepts input from user P (sequence sq31). Specifically, specific event acceptance portion 35 accepts input of designation of a destination registered as a friend from user P in friend selection screen 150 as described with reference to FIG. 14. Then, specific event acceptance portion 35 accepts in input screen 160, input of information to be transmitted from user P as described with reference to FIG. 15.

Then, terminal 2A transmits the accepted specific information to server 5 (sequence sq32). Specifically, specific information transmission portion 34 generates and transmits transmission data including the specific information described with reference to FIG. 8 to server 5.

Server 5 obtains the specific information transmitted from terminal 2A (sequence sq35). Specifically, transmission management portion 43 obtains the specific information from terminal 2A. Transmission management portion 43 selects designated terminal 2B included in the specific information as a transmission destination.

Server 5 transmits the obtained specific information to terminal 2B (sequence sq36). Specifically, transmission management portion 43 has the specific information received from terminal 2A transmitted to terminal 2B which is a terminal at the selected transmission destination.

Terminal 2B obtains the specific information transmitted from terminal 2A through server 5 (sequence sq37). Specifically, specific information reception portion 53 obtains the specific information transmitted from server 5.

Terminal 2B executes a specific event based on the specific information received from server 5 (sequence sq38). Specifically, specific event processing portion 54 executes a specific event described with reference to FIG. 16 based on the obtained specific information.

Through the processing, in terminal 2A, the specific information of which destination has been designated is transmitted to terminal 2B and information from user P can be obtained as the specific event.

<Flow of Processing in Terminal 2>

Figure 21:
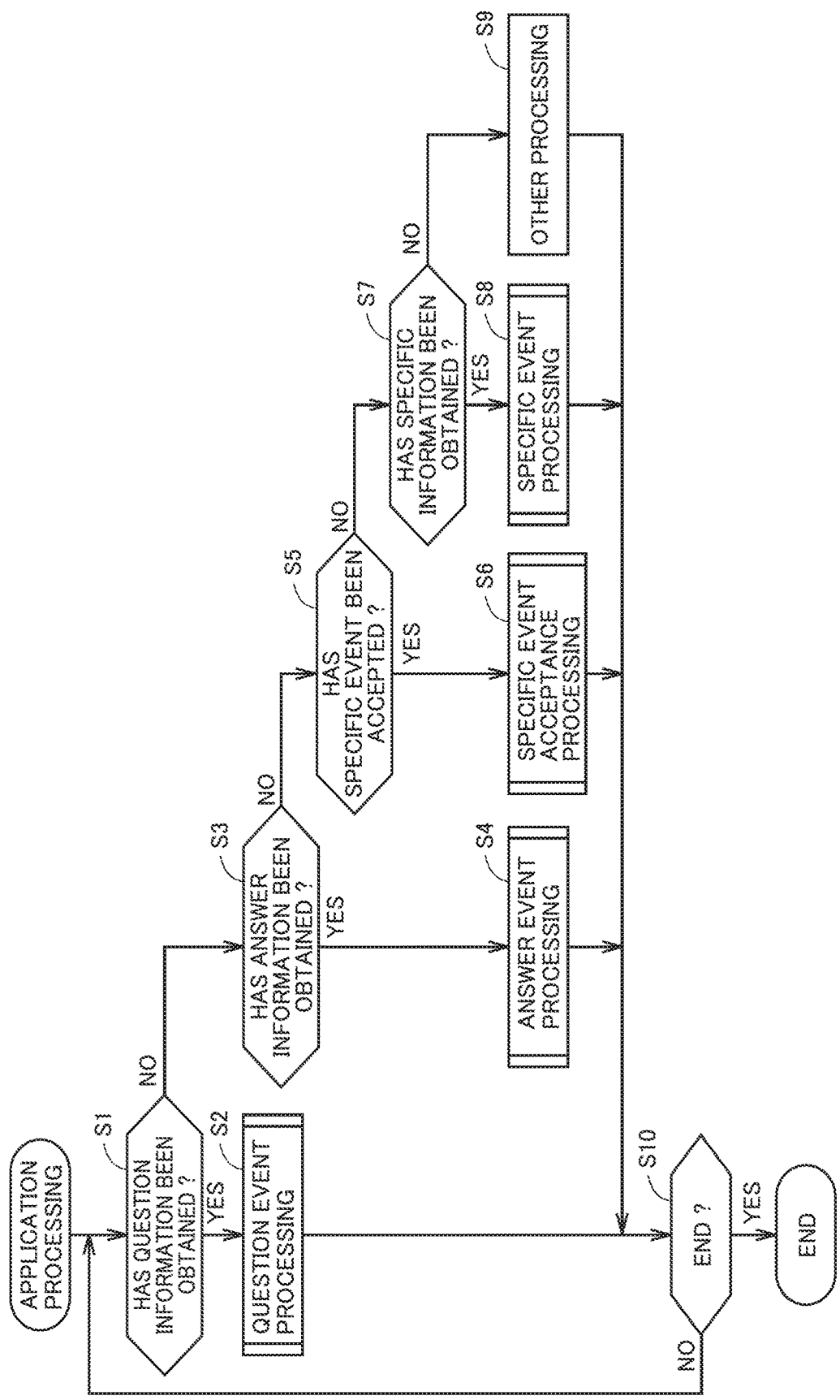
FIG. 21 is a flowchart illustrating application processing performed in terminal 2 based on the first embodiment.

FIG. 21 is a flowchart illustrating application processing performed in terminal 2 based on the first embodiment. Each terminal 2 stores an application program for performing application processing in program storage portion 15.

As shown in FIG. 21, terminal 2 determines whether or not it has obtained question information transmitted from server 5 (step S1). Specifically, question event processing portion 31 determines whether or not the question information has been obtained from server 5.

Then, when terminal 2 determines in step S1 that it has obtained question information (YES in step S1), terminal 2 performs question event processing (step S2). Specifically, when question event processing portion 31 determines that the question information has been obtained from server 5, it performs question event processing. Details of the question event processing will be described later.

Then, the process proceeds to step S10, and terminal 2 determines whether or not to quit application processing. For example, terminal 2 determines whether or not an instruction to quit application processing in response to a prescribed operation instruction through input portion 16 has been given.

When terminal 2 determines in step S10 that there is no instruction to quit application processing and application processing does not end (NO in step S10), the process returns to step S1 and the processing above is repeated.

When terminal 2 determines in step S10 that an instruction to quit application processing has been given and application processing ends (YES in step S10), the process does not return to step S1 but the application processing ends (end).

When terminal 2 determines in step S1 that question information has not been obtained (NO in step S1), the process proceeds to step S3.

Terminal 2 determines in step S3 whether or not it has obtained answer information from server 5 (step S3). Specifically, answer reception portion 51 determines whether or not answer information has been received from server 5.

When terminal 2 determines in step S3 that it has obtained answer information from server 5 (YES in step S3), it performs answer event processing (step S4).

Specifically, when answer reception portion 51 determines that answer information has been received from server 5, it instructs answer event processing portion 52 to perform answer event processing. Details of answer event processing will be described later. Then, the process proceeds to step S10.

When terminal 2 determines in step S3 that it has not obtained answer information from server 5 (NO in step S3), it determines whether or not a specific event has been accepted from a user (step S5). Specifically, specific event acceptance portion 35 determines whether or not an instruction to execute a specific event has been accepted from a user.

When terminal 2 determines in step S5 that a specific event has been accepted from a user (YES in step S5), it performs processing for accepting a specific event (step S6). When it is determined that an instruction to execute a specific event has been accepted from a user, specific event acceptance portion 35 performs processing for accepting a specific event. Details for the processing for accepting a specific event will be described later.

Then, the process proceeds to step S10.

When terminal 2 determines in step S5 that a specific event has not been accepted from a user (NO in step S5), it determines whether or not it has obtained specific information from server 5 (step S7). Specifically, specific information reception portion 53 determines whether or not specific information has been received from server 5.

When terminal 2 determines in step S7 that specific information has been obtained from server 5 (YES in step S7), it performs specific event processing (step S8).

Specifically, when specific information reception portion 53 determines that specific information has been received from server 5, it instructs specific event processing portion 54 to perform specific event processing. Details of the specific event processing will be described later. Then, the process proceeds to step S10.

When terminal 2 determines in step S7 that it has not obtained specific information from server 5 (NO in step S7) and when there is other processing, terminal 2 performs other processing (step S9).

Then, the process proceeds to step S10.

Figure 22:
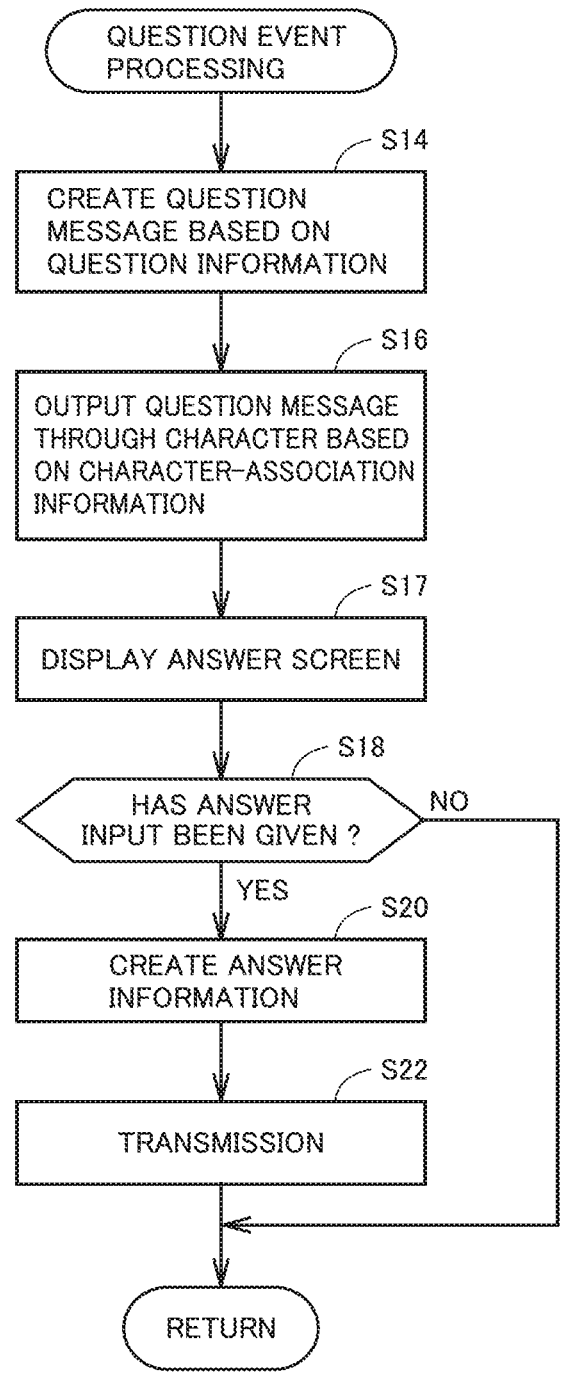
FIG. 22 is a flowchart illustrating question event processing in terminal 2 based on the first embodiment.

FIG. 22 is a flowchart illustrating the question event processing in terminal 2 based on the first embodiment.

As shown in FIG. 22, terminal 2 creates a question message based on question information (step S14). Specifically, question event processing portion 31 creates a question message ("where are you from?") based on the question information obtained from server 5. The question message is not limited to a content of a question obtained from server 5 and an edited question message may be created. For example, in a case of a question to user P of terminal 2A, a question message edited to "where is user P from?" may be created.

Then, terminal 2 outputs a question message through a character based on character-association information (step S16). Specifically, question event processing portion 31 has display portion 17 display question event screen 100 as described with reference to FIG. 9. Then, question event processing portion 31 has a character based on the character-association information (character ID) displayed by way of example and has a question message from the character displayed in question event screen 100.

Then, terminal 2 displays an answer screen (step S17). Specifically, question event processing portion 31 has display portion 17 display answer screen 110 to the question event as described with reference to FIG. 10.

Then, terminal 2 determines whether or not an answer input has been given (step S18). Specifically, answer acceptance portion 32 determines whether or not an input of answer information has been accepted from a user.

When terminal 2 determines in step S18 that an answer input has been given (YES in step S18), terminal 2 creates answer information (step S20). Specifically, when answer acceptance portion 32 accepts an input to select "OK" button 116 on answer screen 110, it is determined that an answer input has been given. Then, answer transmission portion 33 creates answer information as described with reference to FIG. 7 in response to an instruction from answer acceptance portion 32.

Then, terminal 2 transmits answer information to server 5 (step S22). Specifically, answer transmission portion 33 transmits the generated answer information to server 5.

Then, the process ends (return).

When terminal 2 determines in step S18 that no answer input has been given (NO in step S18), the process ends (return). Specifically, when answer acceptance portion 32 accepts an input for selecting "cancel" button 118 in answer screen 110, it is determined that no answer input has been given. Then, the process ends (return).

Figure 23:
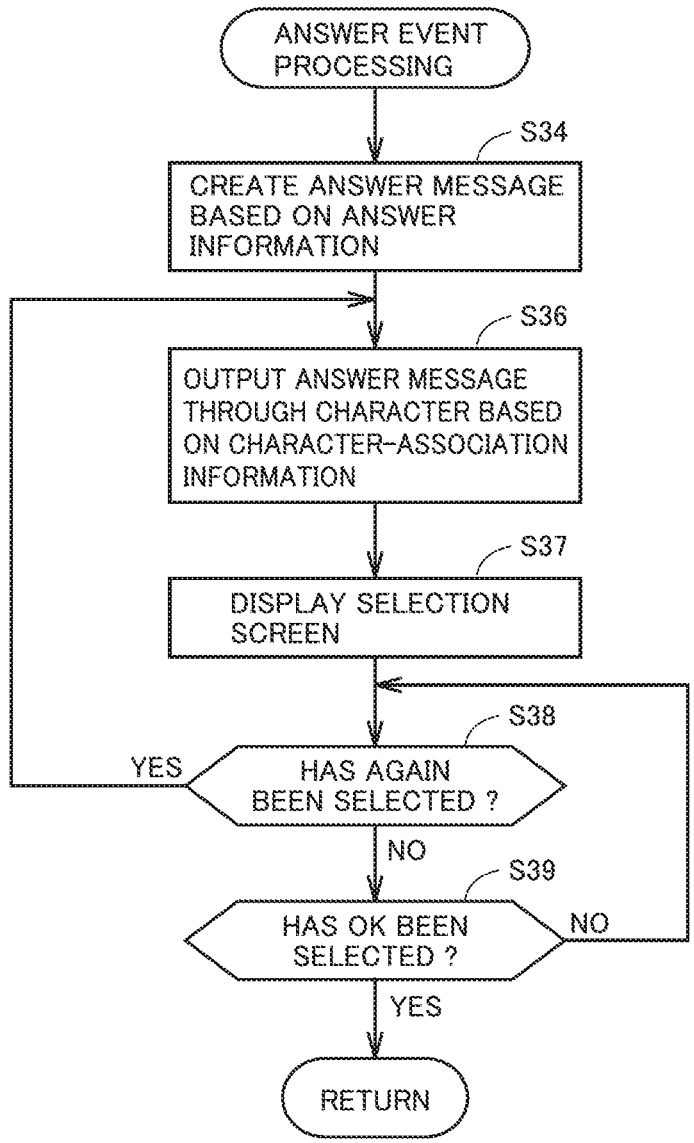
FIG. 23 is a flowchart illustrating answer event processing based on the first embodiment.

FIG. 23 is a flowchart illustrating the answer event processing based on the first embodiment.

As shown in FIG. 23, terminal 2 creates an answer message based on the answer information (step S34). Answer event processing portion 52 creates, by way of example, an answer message "user P says 'I am from 'X prefecture, Y city'" based on a predetermined edition scheme and based on answer data "X prefecture, Y city" included in the answer information obtained from server 5, question data ("where are you from?"), and a terminal ID.

Since there are various known schemes for a scheme for editing an answer message, details thereof will not be described in the present example. An answer message in which other associated data has been added based on answer data may be created. For example, if there is an "amusement park" in an area of "X prefecture, Y city," an answer message edited to include additional information such as "User P is from 'X prefecture, Y city which has an amusement park'" may be created.

Answer event processing portion 52 may extract a word included in answer data (for example, X prefecture, Y city) and create an answer message edited to an answer sentence based on the word under the scheme above. The number of words is not limited to one, and a plurality of words may be extracted to create an answer message edited to an answer sentence.

Then, terminal 2 outputs an answer message through a character based on character-association information (step S36). Specifically, answer event processing portion 52 has display portion 17 display answer event screen 120 as described with reference to FIG. 11. Then, answer event processing portion 52 has a character based on character-association information (character ID) displayed by way of example and has an answer message from the character displayed on answer event screen 120.

Then, terminal 2 displays a selection screen (step S37). Specifically, answer event processing portion 52 has display portion 17 display screen 130 for accepting an instruction input from a user as described with reference to FIG. 12.

Then, terminal 2 determines whether or not the "again" button has been selected (step S38). Specifically, answer event processing portion 52 determines whether or not an input to select "again" button 134 has been accepted in screen 130.

When terminal 2 determines in step S38 that the "again" button has been selected (YES in step S38), the process returns to step S36 and an answer message through the character based on the character-association information is again output.

When terminal 2 determines in step S38 that the "again" button has not been selected (NO in step S38), it determines whether or not the "OK" button has been selected (step S39). Specifically, answer event processing portion 52 determines whether or not an input to select "OK" button 136 has been accepted in screen 130.

When terminal 2 determines in step S39 that the "OK" button has been selected (YES in step S39), the answer event processing ends (return).

When terminal 2 determines in step S39 that the "OK" button has not been selected (NO in step S39), the process returns to step S38.

Figure 24:
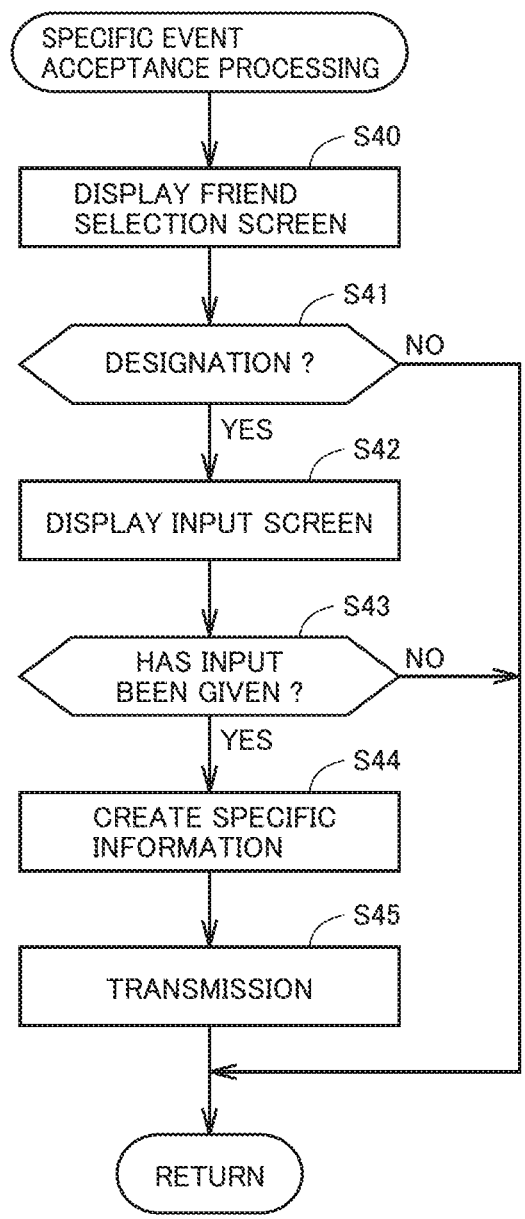
FIG. 24 is a flowchart illustrating specific event acceptance processing in terminal 2 based on the first embodiment.

FIG. 24 is a flowchart illustrating the processing for accepting a specific event in terminal 2 based on the first embodiment.

As shown in FIG. 24, terminal 2 displays a friend selection screen (step S40). Specifically, specific event acceptance portion 35 has display portion 17 display friend selection screen 150 as described with reference to FIG. 14.

Then, terminal 2 determines whether or not designation has been made (step S41). Specifically, specific event acceptance portion 35 determines whether or not a counterpart with which direct data communication is desired has been designated in friend selection screen 150.

When terminal 2 determines in step S41 that designation has not been made (NO in step S41), the process ends (return). Specifically, when specific event acceptance portion 35 accepts an input to select "back" button 152 in friend selection screen 150, it is determined that designation has not been made. Then, the process ends (return).

When terminal 2 determines in step S41 that designation has been made (YES in step S41), it displays an input screen (step S42). Specifically, specific event acceptance portion 35 has display portion 17 display input screen 160 as described with reference to FIG. 15.

Then, terminal 2 determines whether or not an input has been given (step S43). Specifically, specific event acceptance portion 35 determines whether or not information has been input by a user.

When terminal 2 determines in step S43 that input has been given (YES in step S43), it creates specific information (step S44). Specifically, when specific event acceptance portion 35 accepts an input to select "OK" button 164 in input screen 160, it is determined that an input has been made. Then, specific information transmission portion 34 creates specific information as described with reference to FIG. 8 in response to an instruction from specific event acceptance portion 35.

Then, terminal 2 transmits the specific information to server 5 (step S45). Specifically, specific information transmission portion 34 transmits generated specific information to server 5.

Then, the process ends (return).

When terminal 2 determines in step S43 that no input has been given (NO in step S43), the process ends (return). Specifically, when specific event acceptance portion 35 accepts input to select "cancel" button 166 in input screen 160, it is determined that no input has been given. Then, the process ends (return).

Figure 25:
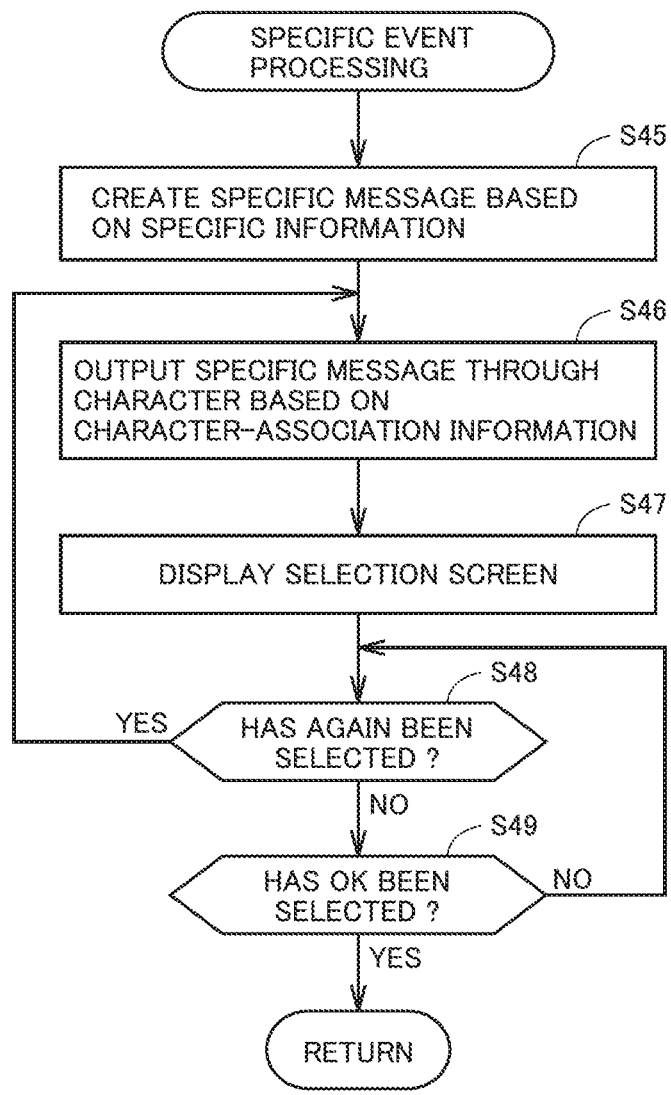
FIG. 25 is a flowchart illustrating specific event processing based on the first embodiment.

FIG. 25 is a flowchart illustrating the specific event processing based on the first embodiment.

As shown in FIG. 25, terminal 2 creates a specific message based on specific information (step S45). Specific event processing portion 54 creates a specific message "hello" based on a predetermined edition scheme and based on specific data "hello" included in the specific information obtained from server 5 and a terminal ID. Since there are various known schemes for a scheme for editing a specific message, details thereof will not be described in the present example. A specific message in which other associated data has been added based on specific data may be created. For example, in a case of a greeting "hello", a specific message edited to include additional information such as "hello, how are you?" may be created with "how are you?" being added.

Then, terminal 2 outputs a specific message through the character based on the character-association information (step S46). Specifically, specific event processing portion 54 has display portion 17 display specific event screen 168 as described with reference to FIG. 16. Then, specific event processing portion 54 has a character based on the character-association information (character ID) displayed by way of example and has a specific message from the character displayed in specific event screen 168.

Then, terminal 2 displays a selection screen (step S47). Specifically, specific event processing portion 54 has display portion 17 display a selection screen for accepting an instruction input from a user as described with reference to FIG. 12.

Then, terminal 2 determines whether or not the "again" button has been selected (step S48). Specifically, specific event processing portion 54 determines whether or not an input to select the "again" button has been accepted in the selection screen.

When terminal 2 determines in step S48 that the "again" button has been selected (YES in step S48), the process returns to step S46 and a specific message through the character based on the character-association information is again output.

When terminal 2 determines in step S48 that the "again" button has not been selected (NO in step S48), it determines whether or not the "OK" button has been selected (step S49). Specifically, specific event processing portion 54 determines whether or not an input to select the "OK" button has been accepted in the selection screen.

When terminal 2 determines in step S49 that the "OK" button has been selected (YES in step S49), the specific event processing ends (return).

When terminal 2 determines in step S49 that the "OK" button has not been selected (NO in step S49), the process returns to step S48.

<Flow of Processing in Server 5>

Figure 26:
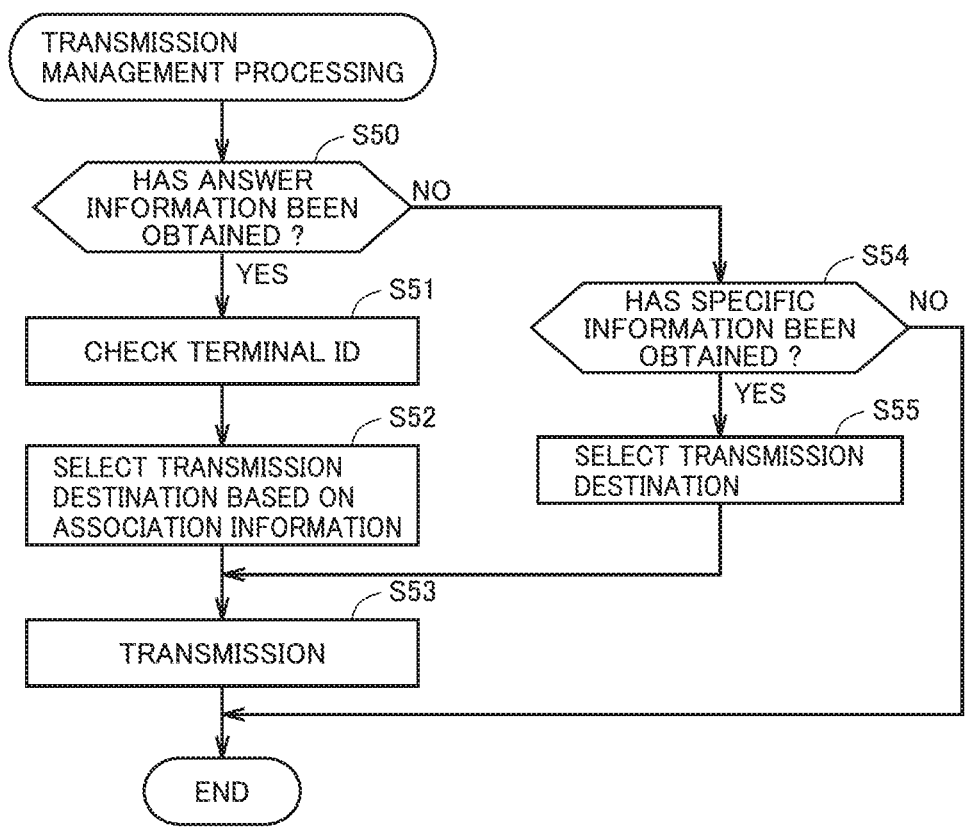
FIG. 26 is a flowchart illustrating transmission management processing performed in server 5 based on the first embodiment.

FIG. 26 is a flowchart illustrating transmission management processing performed in server 5 based on the first embodiment. Server 5 stores an application program for performing the processing in program storage portion 24.

As shown in FIG. 26, server 5 determines whether or not it has obtained answer information from terminal 2 (step S50). Specifically, transmission management portion 43 determines whether or not answer information has been received from terminal 2. By way of example, when received information includes question data, determination as answer information can be made.

Then, when server 5 determines in step S50 that it has obtained answer information (YES in step S50), it checks a terminal ID (step S51). Specifically, transmission management portion 43 checks a terminal ID included in answer information.

Then, server 5 selects a transmission destination based on association information (step S52). Specifically, transmission management portion 43 obtains information on another terminal registered as a friend based on the association information in accordance with the terminal ID and selects that terminal as the transmission destination. For example, when a terminal ID is "T1", terminals 2B and 2C corresponding to characters B and C are selected as transmission destinations based on the association information. Though a case that all terminals registered as friends are selected as destinations is described in the present example, limitation thereto is not particularly intended. One terminal may randomly be selected from among a plurality of terminals as a destination, or a group of some terminals may be selected as a destination.

Then, server 5 transmits answer information to a selected transmission destination (step S53). Specifically, transmission management portion 43 has answer information transmitted to a terminal at the selected transmission destination.

Then, the process ends (end).

When server 5 determines in step S50 that answer information has not been obtained from terminal 2 (NO in step S50), it determines whether or not it has obtained specific information (step S54). Specifically, transmission management portion 43 determines whether or not specific information has been received from terminal 2. By way of example, when received information includes a designated terminal ID, determination as specific information can be made.

When server 5 determines in step S54 that it has obtained specific information (YES in step S54), it selects a transmission destination (step S55). Specifically, transmission management portion 43 selects a terminal corresponding to the designated terminal ID as a transmission destination.

Then, server 5 transmits specific information to the selected transmission destination (step S53). Specifically, transmission management portion 43 has specific information transmitted to a terminal at the selected transmission destination.

Then, the process ends (end).

When server 5 determines in step S54 that it has not obtained specific information (NO in step S54), the process ends (end).

(First Modification)

Though a case that answer transmission portion 33 transmits answer information to server 5 without designating a destination to which the answer information is to be transmitted has been described in the first embodiment, a range of transmission destinations can also be designated. Specifically, for example, a button for selection between "designate all friends" and "designate friend one by one" may be provided in answer screen 110 in FIG. 10 for designating a range. When "designate friend one by one" is selected, a friend selection screen as described with reference to FIG. 14 can be displayed on display portion 17 so that designation by a user can be made. A destination may be designated each time an answer is given, or a user may designate a transmission destination in advance. With such a scheme, a transmission destination of answer information can be designated, so that a user's intention can be reflected, information can be disseminated at ease, and communication between users can be promoted.

(Second Modification)

Though a case that a question message included in question information is stored in a server and the question message is transmitted from the server has been described in the embodiment above, a terminal side may store a question message. Specifically, a server can transmit a question ID as question information, and a question event can be executed as terminal 2 reads a question message corresponding to the question ID.

Second Embodiment

A scheme in which server 5 receives answer information or specific information from terminal 2 and transmits the information with another terminal being designated has been described in the first embodiment.

In a second embodiment, a scheme in which a content of received answer information is analyzed and analyzed information is edited based on a result of analysis will be described.

Figure 27:
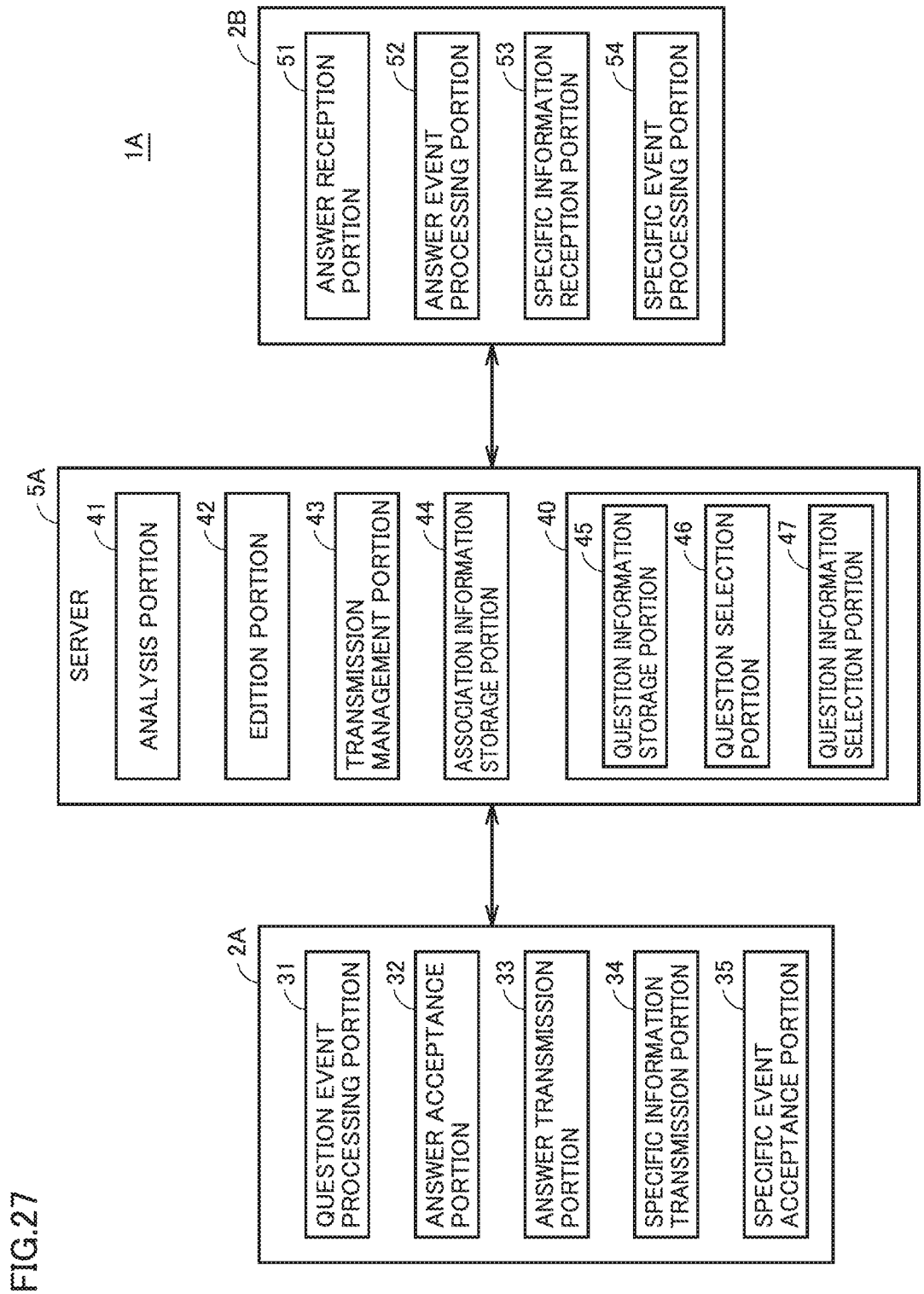
FIG. 27 is a diagram illustrating a configuration of each functional block in an information processing system 1A based on a second embodiment.

FIG. 27 is a diagram illustrating a configuration of each functional block in an information processing system 1A based on the second embodiment.

As shown in FIG. 27, difference from information processing system 1 in FIG. 4 resides in replacement of server 5 with a server 5A.

Server 5A is different from server 5 in further including an analysis portion 41 and an edition portion 42.

Analysis portion 41 analyzes a content of received answer information.

Specifically, analysis portion 41 extracts a word included in answer information and performs analysis processing based on the extracted word by way of example.

Specifically, in analysis processing, whether or not a word expressing emotion is included in extracted words is determined Specifically, whether or not such a word as "like", "do not like," "interesting", "glad", "not interesting," and "sad" is included is determined, and whether a content of answer information is positive, negative, or neither of them (neutral) may be determined.

For example, when a word "like", "interesting", or "glad" is included in answer information, determination as a positive answer may be made. Alternatively, when a word such as "do not like," "not interesting," or "sad" is included in answer information, determination as a negative answer may be made. When no corresponding word is included or when determination cannot be made, determination as a neutral answer may be made.

Analysis portion 41 may make a determination, with emotional levels of a user in response to answer information being categorized into a plurality of stages based on at least one of a word, a meaning of answer information, and other parameters.

Edition portion 42 performs processing for further adding a result of analysis by analysis portion 41 to answer information.

Specifically, processing for including any of "positive", "negative," and "neutral" as analysis information for answer information is performed.

Figure 28:
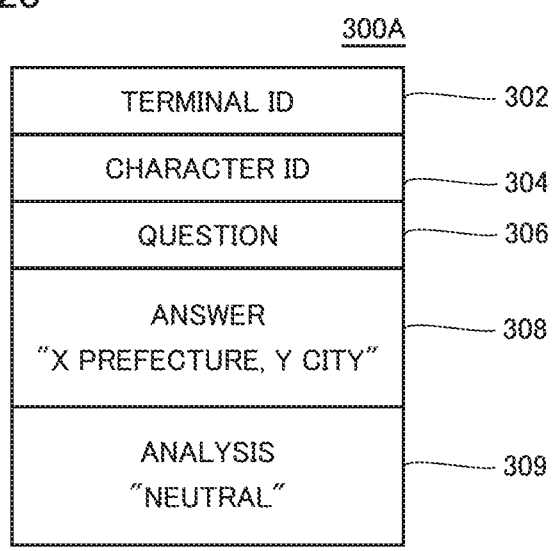
FIG. 28 is a diagram illustrating one example of data of answer information edited by a server 5A based on the second embodiment.

FIG. 28 is a diagram illustrating one example of data of answer information edited by server 5A based on the second embodiment.

FIG. 28 shows transmission data 300A representing answer information.

Transmission data 300A includes terminal ID data 302, character ID data 304, question ID data 306, answer data 308, and analysis data 309.

Terminal ID data 302 is data for specifying a transmitter terminal.

Character ID data 304 is data for specifying a character.

Question data 306 is data for specifying a question.

Answer data 308 is data representing a content of an accepted answer.

Analysis data 309 is data obtained as a result of analysis by analysis portion 41.

By way of example, analysis data 309 is shown as "neutral" here. As described above, by way of example, when a word expressing emotion is included in answer data 308, data for defining "positive" or "negative" may be included.

Server 5A transmits edited answer information to terminal 2B.

Answer reception portion 51 of terminal 2B receives answer information transmitted from server 5A.

Answer event processing portion 52 of terminal 2B executes an answer event to output answer information through a character to another user based on the answer information received by answer reception portion 51. At that time, a manner of an answer event to output answer information through the character to another user is varied based on analysis data included in the answer information.

Specifically, a pattern of the analysis data is registered in association in advance as a pattern of motion of a character which appears in an answer event. By way of example, when there are three patterns of "positive", "negative", and "neutral" as patterns of analysis data, answer event processing portion 52 selects a pattern of motion of the character based on a content of the analysis data and executes an answer event.

In outputting answer information through a character, a sense of realism in output of an answer to a user can be enhanced by varying a manner of output in accordance with a content of answer information. Thus, reaction by a user to the answer can positively be invited. By executing an answer event to answer with information which the user has by making use of character 104, zest of the answer event can be enhanced.

Though answer information received by server 5A has been described in the present example, specific information received by server 5A is also similarly applicable.

<Flow of Processing in Server 5A>

Figure 29:
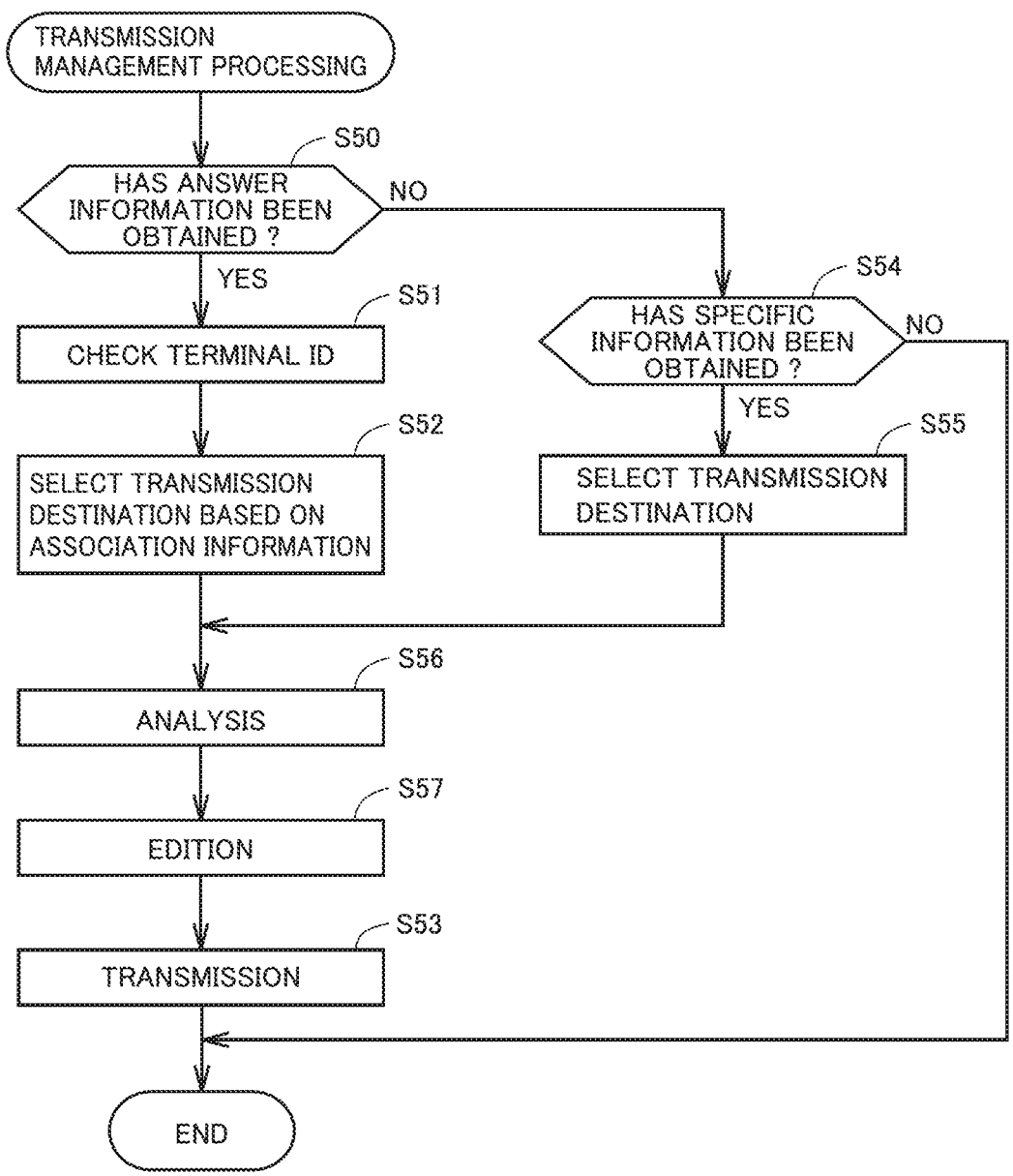
FIG. 29 is a flowchart illustrating transmission management processing performed in server 5A based on the second embodiment.

FIG. 29 is a flowchart illustrating transmission management processing performed in server 5A based on the second embodiment. Server 5A stores an application program for performing the processing in program storage portion 24.

As shown in FIG. 29, further addition of steps S56 and S57 is different from the flow in FIG. 26. Since other portions are the same, detailed description will not be repeated.

After server 5A selects a transmission destination based on association information in step S52, server 5A performs analysis processing (step S56). Specifically, analysis portion 41 analyzes a content of received answer information. By way of example, a word included in answer information is extracted and analysis processing based on the extracted word is performed.

Then, server 5A performs edition processing (step S57). Specifically, edition portion 42 performs processing for further adding a result of analysis by analysis portion 41 to answer information as described with reference to FIG. 28.

Then, server 5 transmits answer information to a selected transmission destination (step S53). Specifically, transmission management portion 43 has answer information transmitted to a terminal at a selected transmission destination.

Then, the process ends (end).

After server 5A selects a transmission destination also for specific information in step S55, server 5A performs analysis processing (step S56). Since subsequent processing is the same, detailed description thereof will not be repeated.

Other Embodiments

Though data communication between terminals through a server has been described in the embodiment above, data may directly be communicated without going through a server.

Specifically, terminals 2A to 2C can each make use of a wireless communication function of communication portion 11 and terminals included in coverage can establish wireless communication.

"Direct data communication" refers to communication by automatic (without an operation by a user) and direct transmission of prescribed data ("answer information" by way of example) stored in memory 14 to another terminal 2B present at a short distance from terminal 2A. Then, another terminal 2B executes an answer event based on answer information.

Alternatively, it refers to communication by automatic (without an operation by a user) and direct reception by terminal 2A of prescribed data ("answer information and character-association information" by way of example) stored in memory 14 of another terminal 2B from another terminal 2B. Then, terminal 2A executes a question event based on the received "question information and character-association information." Data communication in which these processes are performed in parallel may be applicable.

More specifically, wireless communication is carried out by cooperation of CPU 13 and communication portion 11 of terminal 2. This processing is processing performed as background processing, for example, while terminal 2 is in what is called a sleep state (which may also be referred to as a stand-by state). For example, during sleep, such control that communication portion 11 basically mainly operates and sleep of CPU 13 is temporarily canceled as necessary so that CPU 13 temporarily mainly operates is carried out (for example, processing for searching for another terminal is performed by communication portion 11 and transmission and reception of data is carried out by CPU 13). In addition, for example, terminal 2 may include, separately from CPU 13, a second CPU operable with low power consumption, and during sleep, the second CPU may mainly operate. Moreover, wireless communication in the present example may be carried out as appropriate during processing of an application or in response to an instruction operation by a user even when terminal 2 is not in a sleep state. Wireless communication can also be carried out as background processing during execution of an application.

In wireless communication, for example, terminal 2 repeatedly searches for another unspecified terminal 2 present within coverage of near field communication. Then, terminal 2 establishes communication with another terminal 2 which was found as a result of search. Then, terminal 2 automatically transmits communication data stored in memory 14 or automatically receives communication data stored in memory 14 of another terminal 2 from that another terminal 2.

Wireless communication above can be carried out, for example, at the time when users each carrying terminal 2 pass each other.

An application executable by a personal computer may be provided as a program in the present embodiment. Here, the program according to the present embodiment may be incorporated as a partial function (a module) of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A system, comprising:
    a first terminal;
    a second terminal; and
    a server,
    the server including
        a memory which stores a plurality of pieces of question information and stores relation information as to whether a first user of the first terminal and a second user of the second terminal have prescribed relation with each other, and
        a first processor,
    the first processor configured to cause the server to automatically select one piece of question information from the plurality of pieces of question information and transmit the selected question information to the first terminal,
    the first terminal including a first display and a second processor,
    the second processor configured to cause the first terminal to display question information and at least one virtual character, captured by a virtual camera positioned in a virtual three-dimensional space, the at least one virtual character animated to appear as entering the virtual three-dimensional space and convey the question information to the first user using the first display, accept input of answer information to the question information from the first user, and transmit the accepted answer information to the server, the answer information not including information on the second terminal,
    the first processor of the server configured to cause the server to receive the answer information, determine whether the first user and the second user have a prescribed relation with each other based on the relation information stored in the memory, and transmit the received answer information to the second terminal when the first user and the second user have the prescribed relation with each other,
    the second terminal including a second display and a third processor, and
    the third processor causing the second terminal to receive the answer information from the server and cause the second display to display the answer information and the virtual character, captured by the virtual camera positioned in the virtual three-dimensional space, the at least one virtual character animated to appear as entering the virtual three-dimensional space and convey the answer information to the second user.

2. The system according to claim 1, wherein the at least one virtual character is displayed as leaving the virtual three-dimensional space when the answer information is transmitted to the server.

3. The system according to claim 1, wherein the at least one virtual character is displayed as entering the virtual three-dimensional space when the answer information is received from the server.

4. The system according to claim 1, wherein a motion of the at least one virtual character is varied in accordance with a content of a message conveyed in the question and/or answer information.

5. The system according to claim 1, wherein the at least one virtual character is animated to appear as entering the virtual three-dimensional space by displaying the at least one virtual character as entering a room through a door in the virtual three-dimensional space.

6. An information processing system, in which a plurality of terminals can communicate data through a server, comprising:
    a first terminal, among the plurality of terminals, having processing circuitry configured to:
        execute a question event to have question information and at least one virtual character, captured by a virtual camera positioned in a virtual three-dimensional space, the at least one virtual character animated to appear as entering the virtual three-dimensional space and convey the question information, displayed to a user who operates the first terminal, the virtual character being based on information associated with the virtual character designated by the server,
        accept input of answer information to the question information from the user, and
        transmit the answer information to the server, the answer information including the information associated with the virtual character, and
    a second terminal, among the plurality of terminals, having processing circuitry configured to:
        receive the answer information from the server, and
        execute an answer event to have the answer information and the virtual character, captured by the virtual camera positioned in the virtual three-dimensional space, the at least one virtual character animated to appear as entering the virtual three-dimensional space and convey the answer information, displayed to a user who operates the second terminal, the virtual character being based on the information associated with the virtual character and included in the answer information.

7. The information processing system according to claim 6, wherein the at least one virtual character includes a virtual character associated with the user or a virtual character associated with another user.

8. The information processing system according to claim 7, wherein
    the at least one virtual character includes an avatar representing the user or an avatar representing another user.

9. The information processing system according to claim 6, wherein the at least one virtual character is configured with three-dimensional data.

10. The information processing system according to claim 6, wherein
    a plurality of second terminals are provided, and
    the server transmits the answer information received from the first terminal to each of the second terminals.

11. The information processing system according to claim 6, wherein
    the first terminal is configured to transmit the answer information to the server without designating a destination of the second terminal.

12. The information processing system according to claim 6, wherein
    the server includes at least one memory configured to store association information on at least one second terminal associated with the first terminal and the server is further configured to transmit the answer information received from the first terminal to an associated second terminal based on the association information.

13. The information processing system according to claim 6, wherein the first terminal is further configured to accept input of a word as the answer information to the question information from the user, and the second terminal is further configured to output as the answer event, an answer sentence including the word in the answer information through the at least one virtual character to another user based on the received answer information.

14. The information processing system according to claim 6, wherein the server includes at least one memory configured to store a plurality of pieces of question information in advance, the server being further configured to:

select at least one piece of question information from the plurality of pieces of question information regardless of an operation by a user other than the user who operates the first terminal, and transmit the selected question information to the first terminal.

15. The information processing system according to claim 6, wherein the second terminal is configured to output the question information in association with the at least one virtual character to the user who operates the second terminal after the answer information is output.

16. The information processing system according to claim 6, wherein the first terminal is configured to transmit specific information of which destination is designated as the second terminal, and the second terminal is further configured to:

receive the specific information from the server, and execute a specific event to output the specific information through the at least one virtual character to another user based on the received specific information.

17. An information processing apparatus capable of communicating data with another information processing apparatus through a server, comprising:

a processor; and a memory storing computer readable instructions that, when executed by the processor, cause the information processing apparatus to:

execute a question event to have question information and at least one virtual character, captured by a virtual camera positioned in a virtual three-dimensional space, the at least one virtual character animated to appear as entering the virtual three-dimensional space and convey the question information, displayed to a user who operates the information processing apparatus, the virtual character being based on information associated with the virtual character designated by the server;

accept input of answer information to the question information from the user;

transmit the answer information to the server, the answer information including the information associated with the virtual character;

receive answer information transmitted from another information processing apparatus from the server; and execute an answer event to have the answer information and the virtual character, captured by the virtual camera positioned in the virtual three-dimensional space, the at least one virtual character animated to appear as entering the virtual three-dimensional space and convey the answer information, displayed to a user who operates the another information processing apparatus, the virtual character being based on the information associated with the virtual character and included in the answer information.

18. A non-transitory storage medium encoded with a computer readable program executed by a computer of an information processing apparatus capable of communicating data with another information processing apparatus through a server, the program causing the computer of the information processing apparatus to provide execution comprising:

executing a question event to have question information and at least one virtual character, captured by a virtual camera positioned in a virtual three-dimensional space, the at least one virtual character animated to appear as entering the virtual three-dimensional space and convey the question information, displayed to a user who operates the information processing apparatus, the virtual character being based on information associated with the virtual character designated by the server;

accepting input of answer information to the question information from the user;

transmitting the answer information to the server, the answer information including the information associated with the virtual character;

receiving answer information transmitted from another information processing apparatus from the server; and executing an answer event to have the answer information and the virtual character, captured by the virtual camera positioned in the virtual three-dimensional space, the at least one virtual character animated to appear as entering the virtual three-dimensional space and convey the answer information, displayed to a user who operates the another information processing apparatus, the virtual character being based on the information associated with the virtual character and included in the answer information.

19. A method of controlling an information processing apparatus capable of communicating data with another information processing apparatus through a server, the method comprising:

executing a question event to have question information and at least one virtual character, captured by a virtual camera positioned in a virtual three-dimensional space, the at least one virtual character animated to appear as entering the virtual three-dimensional space and convey the question information, displayed to a user who operates the information processing apparatus, the virtual character being based on information associated with the virtual character designated by the server;

accepting input of answer information to the question information from the user;

transmitting the accepted answer information to the server, the answer information including the information associated with the virtual character;

receiving answer information transmitted from another information processing apparatus from the server; and executing an answer event to have the answer information and the virtual character, captured by the virtual camera positioned in the virtual three-dimensional space, the at least one virtual character animated to appear as entering the virtual three-dimensional space and convey the answer information, displayed to a user who operates the another information processing apparatus, the virtual character being based on the information associated with the virtual character and included in the answer information.

* * * * *